United States Patent
Kurosawa et al.

(10) Patent No.: US 10,649,769 B2
(45) Date of Patent: *May 12, 2020

(54) VEHICLE-MOUNTED CONTROL DEVICE, PROGRAM WRITING DEVICE, PROGRAM GENERATING DEVICE AND PROGRAM

(71) Applicant: HITACHI AUTOMOTIVE SYSTEMS, LTD., Hitachinaka-shi, Ibaraki (JP)

(72) Inventors: Kenichi Kurosawa, Hitachinaka (JP); Hidetoshi Teraoka, Tokyo (JP); Fumiharu Nakahara, Hitachinaka (JP)

(73) Assignee: HITACHI AUTOMOTIVE SYSTEMS, LTD., Hitachinaka-Shi (JP)

(*) Notice: Subject to any disclaimer, the term of this patent is extended or adjusted under 35 U.S.C. 154(b) by 0 days.

This patent is subject to a terminal disclaimer.

(21) Appl. No.: 16/270,781

(22) Filed: Feb. 8, 2019

(65) Prior Publication Data

US 2019/0171445 A1 Jun. 6, 2019

Related U.S. Application Data

(63) Continuation of application No. 15/540,724, filed as application No. PCT/JP2016/050409 on Jan. 8, 2016, now Pat. No. 10,228,934.

(30) Foreign Application Priority Data

Jan. 26, 2015 (JP) .................................. 2015-012021

(51) Int. Cl.
*G06F 8/71* (2018.01)
*G06F 8/658* (2018.01)
(Continued)

(52) U.S. Cl.
CPC ................ *G06F 8/71* (2013.01); *B60R 16/02* (2013.01); *B60R 16/0231* (2013.01);
(Continued)

(58) Field of Classification Search
CPC .......... G06F 8/65; G06F 12/0292; G06F 8/71; G06F 3/0611; G06F 8/60; G06F 8/658;
(Continued)

(56) References Cited

U.S. PATENT DOCUMENTS 6,999,976 B2  2/2006 Abdallah et al.
7,509,635 B2 * 3/2009 Woodhouse ............ G06F 8/658
717/168

(Continued)

FOREIGN PATENT DOCUMENTS

JP   2003-337723 A   11/2003
JP   2004-234503 A   8/2004
(Continued)

OTHER PUBLICATIONS

Extended Search Report in Application No. 16743046.1 dated Dec. 14, 2018.
(Continued)

*Primary Examiner* — Marina Lee
(74) *Attorney, Agent, or Firm* — Foley & Lardner LLP

(57) ABSTRACT

The present invention provides a vehicle-mounted control device, a program writing device, a program generating device, and a program, which are capable of quickly and easily carrying out reprogramming. An ECU 300 is provided with: a microcomputer 301, an SRAM 302, a flash memory 303, and a communication device 305. The flash memory 303 is configured from a plurality of blocks and stores older versions of the program. The communication device 305 receives (S250) a frame including block data, the type of the block data, and an address of a block in which the block data (Continued)

is to be written. The microcomputer 301 restores (S260) a new program from the block data in the SRAM 302 according to the type of the block data (S255, S260) and writes (S265, S270) one piece of the restored new program in a block corresponding to the address.

12 Claims, 24 Drawing Sheets

(51) Int. Cl.
*B60R 16/023* (2006.01)
*G06F 3/06* (2006.01)
*B60R 16/02* (2006.01)
*G06F 11/00* (2006.01)

(52) U.S. Cl.
CPC ............ *G06F 3/064* (2013.01); *G06F 3/0608* (2013.01); *G06F 3/0673* (2013.01); *G06F 8/658* (2018.02); *G06F 11/00* (2013.01)

(58) Field of Classification Search
CPC ...... G06F 3/0608; G06F 3/064; G06F 3/0673; G06F 11/00; B60R 16/023; B60R 16/02
USPC .......................................... 717/122, 168–178
See application file for complete search history.

(56) References Cited

U.S. PATENT DOCUMENTS

| | | | | |
|---|---|---|---|---|
| 7,814,474 | B2* | 10/2010 | Chen | G06F 8/65 717/168 |
| 7,865,479 | B2* | 1/2011 | Gu | G06T 7/97 707/693 |
| 8,418,167 | B2 | 4/2013 | Meller et al. | |
| 8,615,500 | B1* | 12/2013 | Armangau | G06F 16/1752 707/693 |
| 9,053,107 | B1* | 6/2015 | Le | G06F 16/10 |
| 10,228,934 | B2* | 3/2019 | Kurosawa | B60R 16/0231 |
| 2004/0054858 | A1 | 3/2004 | Chandrasekaran et al. | |
| 2006/0190939 | A1 | 8/2006 | Chen et al. | |
| 2011/0066788 | A1 | 3/2011 | Eleftheriou et al. | |
| 2011/0173601 | A1* | 7/2011 | de los Reyes | G06F 8/658 717/169 |
| 2013/0080580 | A1* | 3/2013 | Nagai | G06F 8/658 709/217 |
| 2014/0245275 | A1 | 8/2014 | Elias et al. | |
| 2015/0301823 | A1 | 10/2015 | Hatakeyama | |
| 2016/0004530 | A1 | 1/2016 | Liang et al. | |
| 2016/0364230 | A1 | 12/2016 | Moeller et al. | |
| 2017/0228741 | A1 | 8/2017 | Dilevski et al. | |
| 2018/0018164 | A1* | 1/2018 | Kurosawa | B60R 16/0231 |
| 2019/0171445 | A1* | 6/2019 | Kurosawa | B60R 16/0231 |

FOREIGN PATENT DOCUMENTS

| | | |
|---|---|---|
| JP | 2011-081604 A | 4/2011 |
| JP | 2013-073417 A | 4/2013 |
| JP | 2014-112419 A | 6/2014 |
| JP | 2014-182571 A | 9/2014 |
| WO | WO-2014/148003 A1 | 9/2014 |

OTHER PUBLICATIONS

Japanese Office Action and English translation thereof issued in the corresponding application No. 2016-571893 dated Apr. 3, 2018.
Office Action issued in corresponding Japanese Patent Application No. 2018-211085 dated Oct. 8, 2019.

* cited by examiner

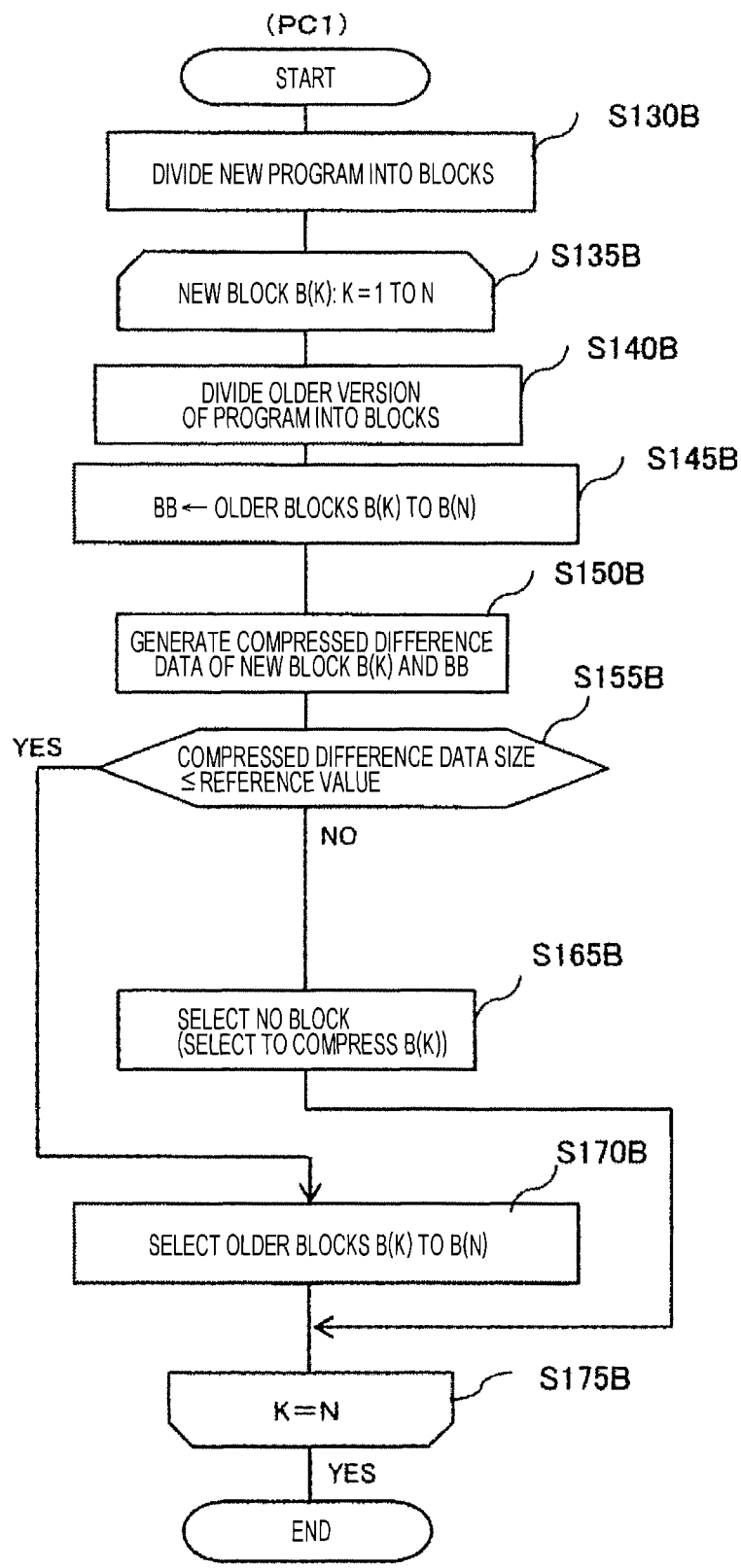

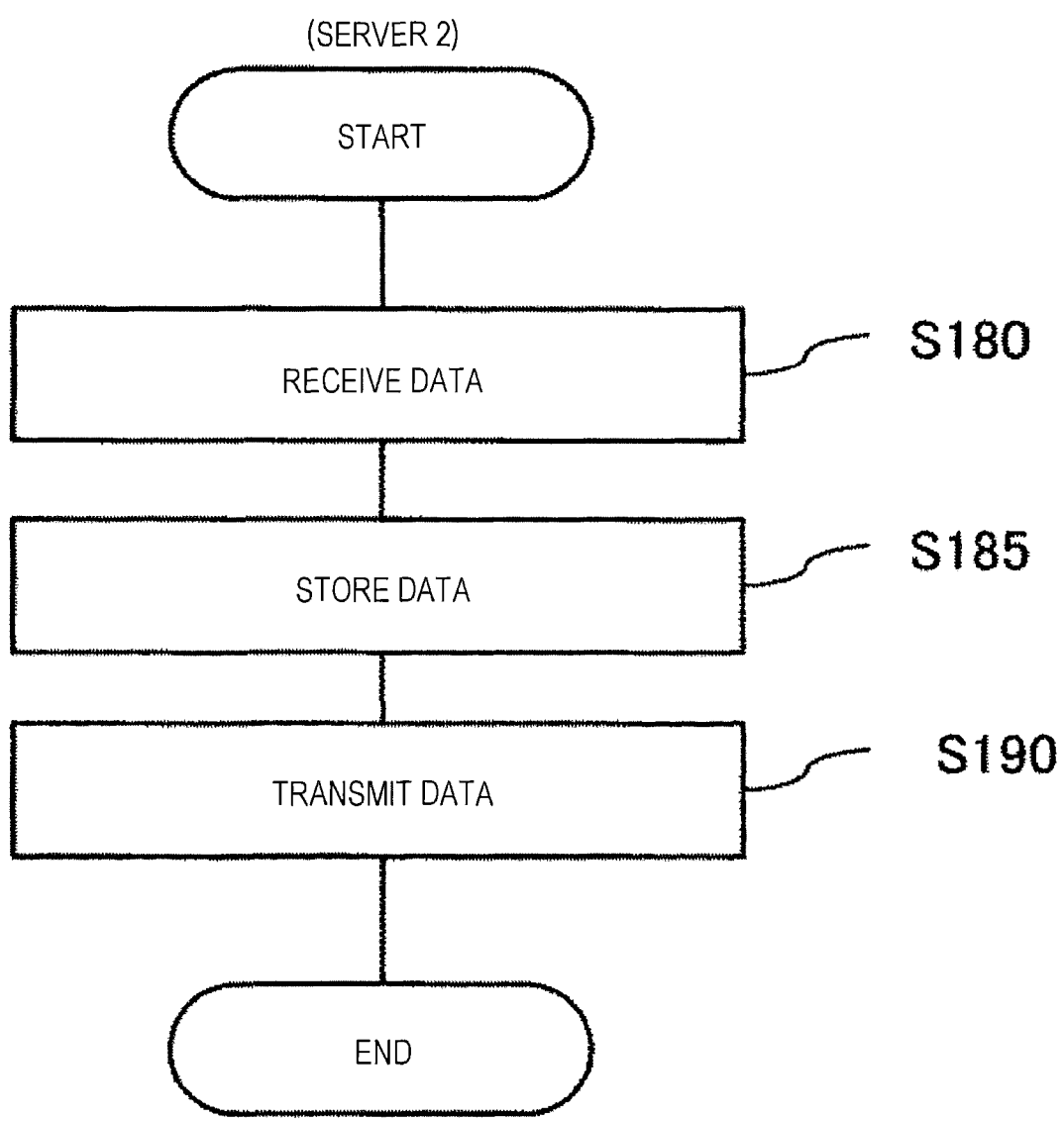

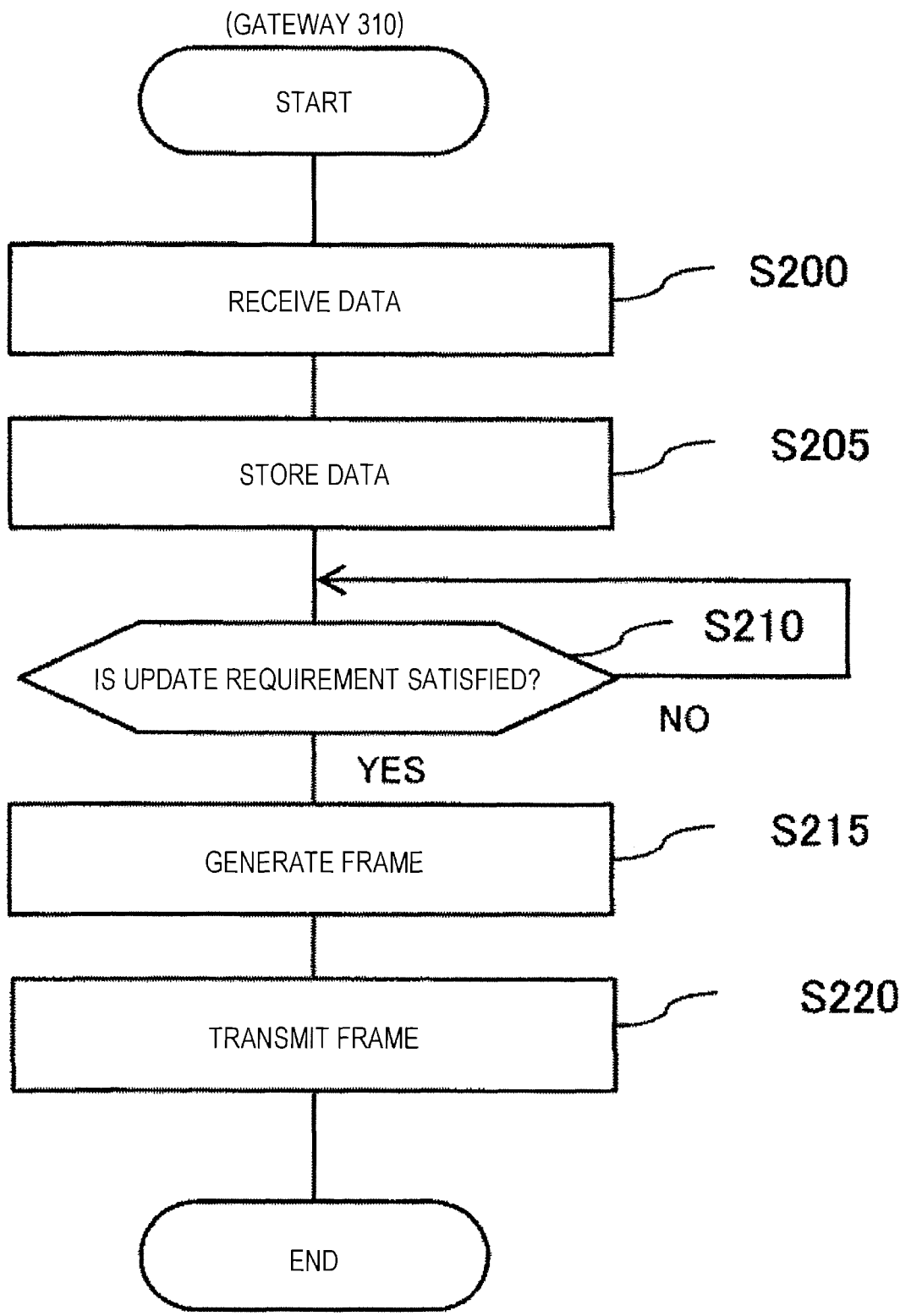

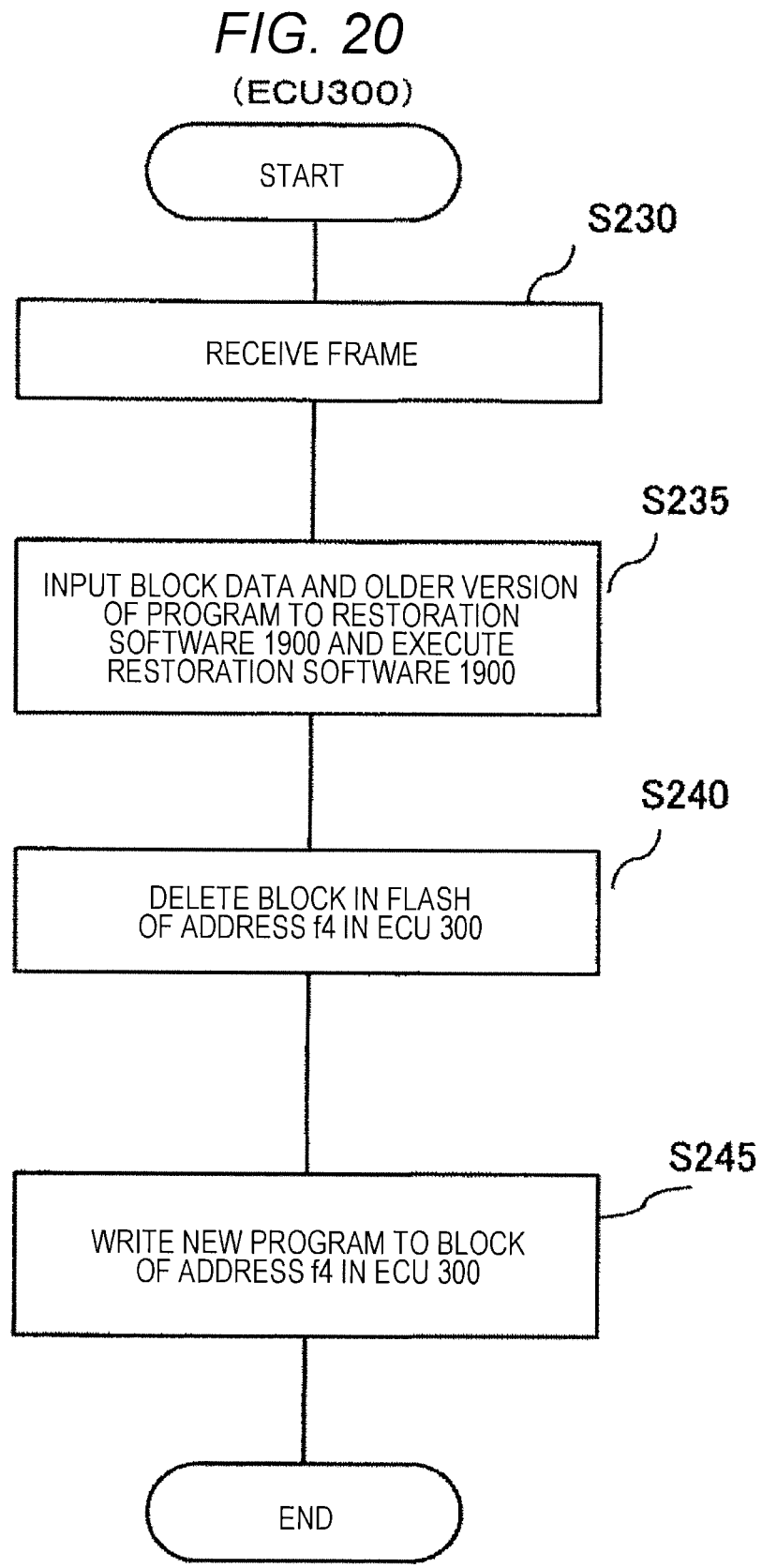

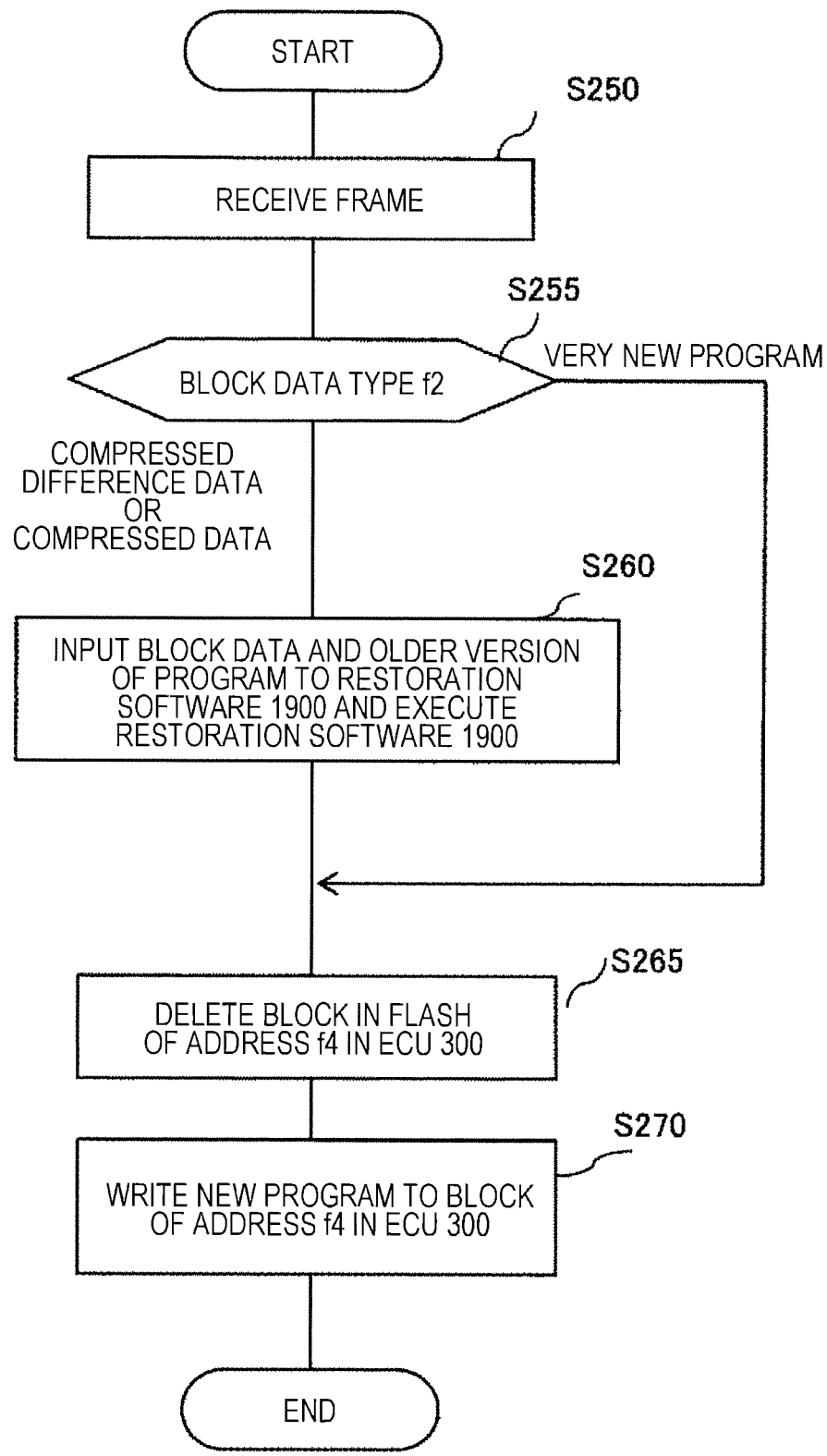

VEHICLE-MOUNTED CONTROL DEVICE, PROGRAM WRITING DEVICE, PROGRAM GENERATING DEVICE AND PROGRAM

TECHNICAL FIELD

The present invention relates to a vehicle-mounted control device, a program writing device, a program generating device, and a program.

BACKGROUND ART

In related reprogramming, a personal computer (PC), serving as a writing tool, and a vehicle-mounted control device (ECU: engine control unit) are connected via a controller area network (CAN) which operates in slow speed and a load module (a new program) is divided and transmitted to be written in a flash memory in the ECU.

Further, also in a case that a part of the new program to be updated in the older version of the program is small, the entire new program is transferred via the CAN and the entire new program is written.

Thus, there has been a problem that writing takes time. To address this problem, a concept of differential reprogramming has been proposed (PTL 1, for example). In other words, in paragraph 0020 in PTL 1, difference rewriting is described as one of rewriting method.

CITATION LIST

Patent Literature

PTL 1: JP 2011-081604 A

SUMMARY OF INVENTION

Technical Problem

In such a technology disclosed in PTL 1, a difference between an entire new program and an older version of the entire program is transmitted in general.

However, although a microcomputer in the ECU has a large FLASH memory to store a program, the size of the static random access memory (SRAM) used as a work memory is small. Thus, it has been difficult to store a difference between the entire new program and the older version of the entire program in the SRAM and restore the entire new program.

The present invention has an object to provide a vehicle-mounted control device, a program writing device, a program generating device, and a program, which are capable of quickly and easily carrying out reprogramming.

Solution to Problem

To achieve the above object, focusing on that the FLASH memory mounted in the microcomputer of the ECU is configured from a plurality of blocks, a basic concept of the present invention is to divide a new program and an older version of the program into units of blocks, transfer, to a vehicle control device, compressed difference data in which a difference between the new program of the block and the older version of the program in more than one blocks is compressed, restore the new program by using the older version of the program in more than one blocks in the FLASH memory after decompressing the compressed difference data received in the vehicle control device, and write the restored new program to the block in the FLASH memory, and the above processes are repeated for each block. With this configuration, since the difference is further compressed, the entire new program can be restored even with a small SRAM by restoring the program in units of blocks. It is noted that, when the SRAM is sufficient in size, the compressed difference data may be generated with a difference generated by using the new program in unit of more than one blocks and the program may be restored. Further, the present invention has an object to shorten the write time by using the compressed difference data in which the difference is compressed, without simply using the difference between the new program and the older version of the program.

Based on the above describe basic concept, the present invention includes a non-volatile memory (FLASH) which is configured from a plurality blocks and stores an older version of a program, a volatile memory (SRAM), a communication unit that receives a frame including block data, which includes compressed difference data obtained by dividing a new program and the older version of the program in a size of the blocks and compressing a difference between the new program in the block and the older version of the program in more than one blocks, or compressed data in which the new program in the block is compressed, a type of the block data, and an address of the block in the non-volatile memory (FLASH), and a computation unit that restores the new program in the block, in the volatile memory (SRAM), from the block data and the older version of the program in more than one blocks according the type of the block data or restores the new program in the block, in the volatile memory (SRAM), from the block data, and writes the restored new program of the block to the block corresponding to the address.

Advantageous Effects of Invention

According to the present invention, reprogramming can be carried out quickly and easily. In addition to the above, other objects, configurations, and effects will be described in the following embodiment.

BRIEF DESCRIPTION OF DRAWINGS

FIG. 14B is a flowchart of selecting more than one older blocks for a new program in which a large program is deleted.

FIG. 15 is a flowchart illustrating a process in a server illustrated in FIG. 1.

FIG. 16 is a flowchart illustrating a process in a gateway illustrated in FIG. 3.

FIG. 20 is a flowchart of a FLASH writing process in the ECU compatible with the selection-function-included compressed difference data generating software.

FIG. 21 is a flowchart of a FLASH writing process in the ECU compatible with the restriction-function-included compressed difference data generating software.

DESCRIPTION OF EMBODIMENTS

In the following, a configuration and operation of a system including a vehicle-mounted control device according to an embodiment of the present invention will be described with reference to the drawings.

Figure 1:
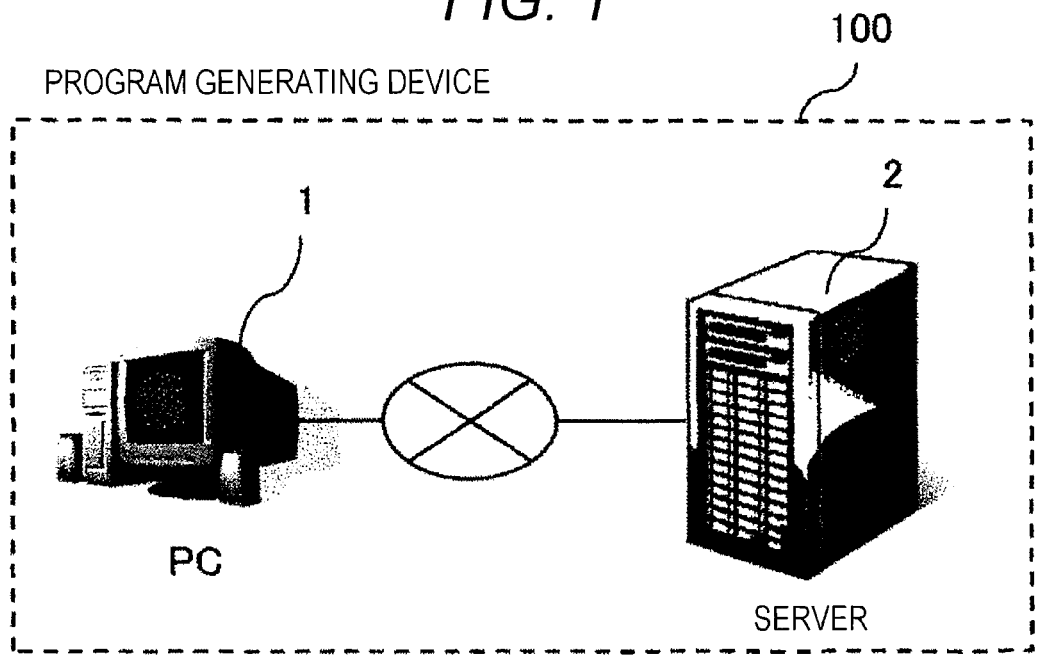
FIG. 1 is a schematic view illustrating an entire configuration of a system according to an embodiment of the present invention.

Firstly, with reference to FIG. 1, an entire configuration of the system will be explained. FIG. 1 is a schematic view illustrating the entire configuration of the system according to the embodiment of the present invention.

The system includes a program generating device 100 and a vehicle-mounted system 3.

The program generating device 100 generates data from a new program and an older version of the program stored in a vehicle-mounted control device in the vehicle-mounted system 3 and transmits the generated data to the vehicle-mounted system 3. The details will be described later with reference to FIGS. 8 to 15.

The program generating device 100 includes a PC 1 and a server 2. The PC 1 is connected to the server 2 via a local area network (LAN) for example. Here, the PC 1 and server 2 may be directly connected by using a crossover cable.

The program generating device 100 wirelessly communicates with the vehicle-mounted system 3. The communication is performed via the Internet, a cellular network, or a wireless LAN, for example. Here, in FIG. 1, to simplify the drawing, repeaters such as a router and an access point are not illustrated.

The vehicle-mounted system 3 receives data from the program generating device 100 and updates a program of the vehicle-mounted control device included in the vehicle-mounted system 3 based on the received data. Here, the details will be described later with reference to FIGS. 16 to 21.

Figure 2:
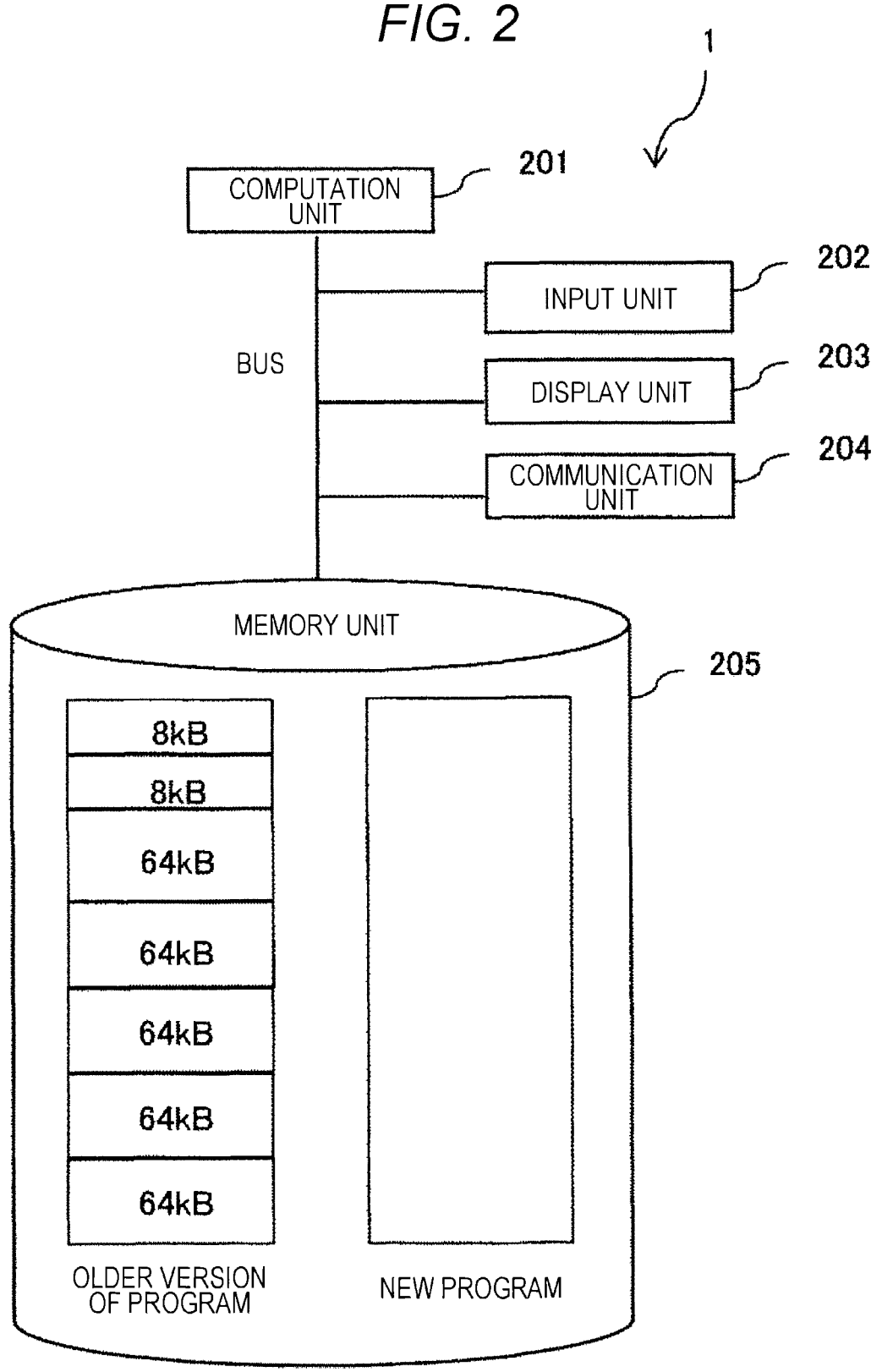
FIG. 2 is a configuration diagram of a PC illustrated in FIG. 1.

Next, with reference to FIG. 2, a configuration of the PC 1 will be explained. FIG. 2 is a configuration diagram of the PC 1 of FIG. 1.

The PC 1 includes a computation unit 201 such as a central processing unit (CPU), an input unit 202 such as a keyboard and a mouse, a display unit 203 such as a liquid crystal display (LCD), a communication unit 204 such as a network interface card (NIC), and a memory unit 205 such as a random access memory (RAM), a read only memory (ROM), and a hard disk drive (HDD). The computation unit 201, input unit 202, display unit 203, and communication unit 204 are connected to a bus.

The memory unit 205 stores an old version of a program which is the same program stored in a FLASH memory of the vehicle-mounted control device in the vehicle-mounted system 3 and a new program which is an update of the old version of the program.

Here, a configuration of the server 2 of FIG. 1 is the same as the configuration of the PC 1. In other words, the server 2 includes a computation unit 201S, an input unit 202S, a display unit 203S, a communication unit 204S, and a memory unit 205S.

Figure 3:
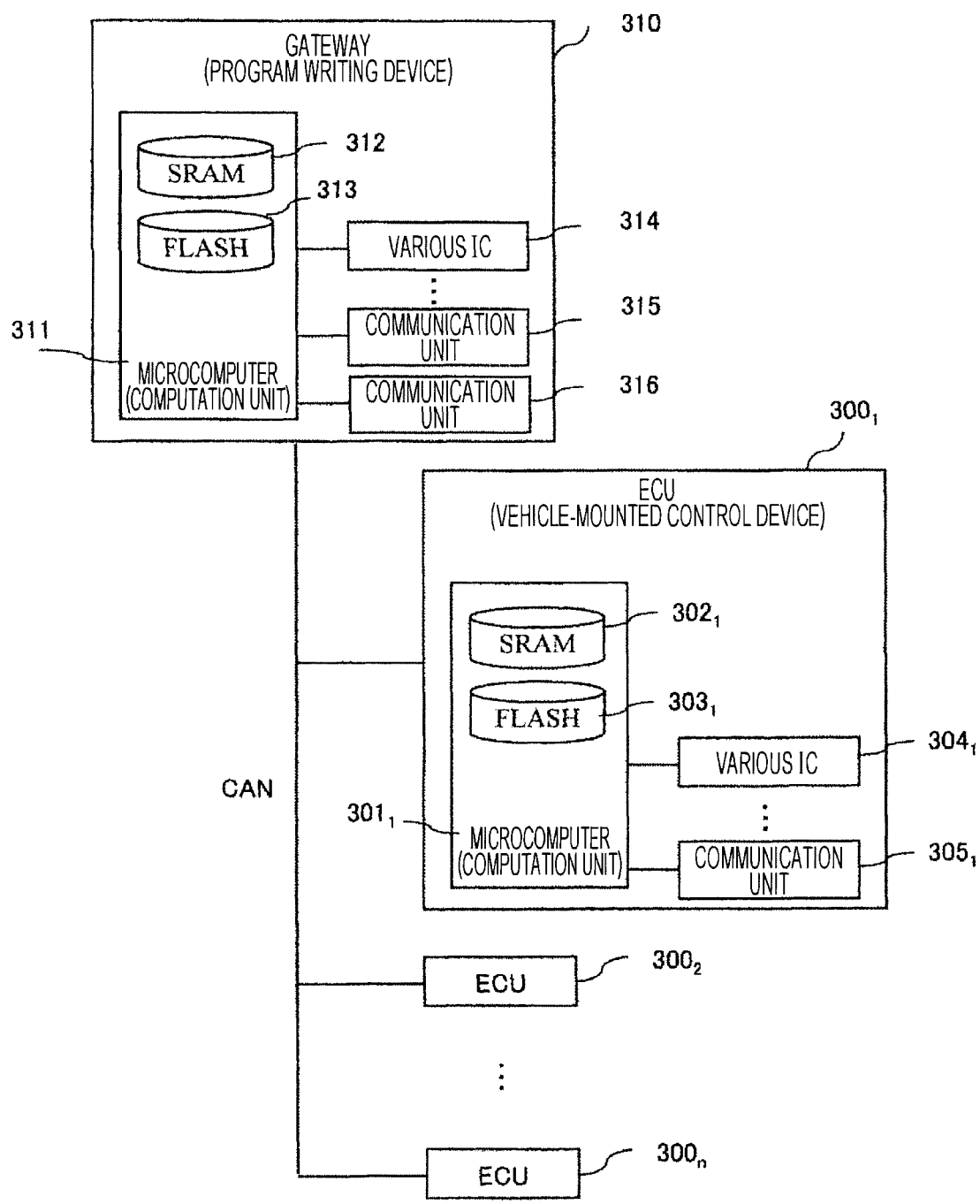
FIG. 3 is a configuration diagram of a vehicle-mounted system illustrated in FIG. 1.

Next, with reference to FIG. 3, a configuration of the vehicle-mounted system 3 will be described. FIG. 3 is a configuration diagram of the vehicle-mounted system 3 of FIG. 1.

The vehicle-mounted system 3 includes a gateway 310 (a program writing device) and a plurality of ECUs 300 ($300_1$ to $300_n$). The gateway 310 and ECUs 300 communicate with each other via a vehicle-mounted network CAN.

The gateway 310 relays data between an external network and an in-vehicle CAN when an authentication is succeeded.

The ECU 300 includes a microcomputer 301, various integrated circuits (ICs) 304 corresponding to usage of each ECU 300, and a communication unit 305 such as a CAN transceiver. The microcomputer 301 internally includes an SRAM 302 (a volatile memory) and a FLASH memory 303 (non-volatile memory).

Here, the configuration of the gateway 310 is also basically same as the configuration of the ECU 300 and further includes a communication unit compatible with a protocol of the vehicle external network. In other words, the gateway 310 includes a communication unit 315 such as a microcomputer 311, various ICs 314, a CAN transceiver, and the like and a communication unit 316 compatible with the protocol of the vehicle external network. The microcomputer 311 internally includes an SRAM 312 and a FLASH memory 313.

Figure 4:
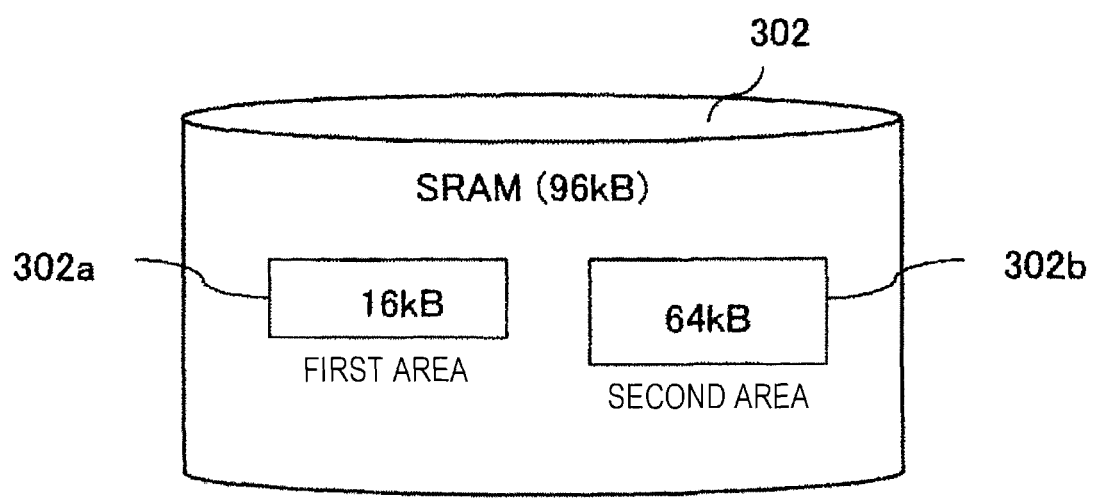
FIG. 4 is a schematic view illustrating an internal configuration of an SRAM in an ECU illustrated in FIG. 3.

Next, with reference to FIG. 4, a configuration of the SRAM 302 in the ECU 300 will be described. FIG. 4 is a schematic view illustrating an internal configuration of the SRAM 302 of FIG. 3.

The SRAM 302 includes a first area 302a that temporarily stores data and a second area 302b that restores the data stored in the first area 302a.

According to the present embodiment, as an example, the size of the SRAM 302 is 96 kB, the size of the first area 302a is 16 kB, and the size of the second area 302b is 64 kB.

Figure 5:
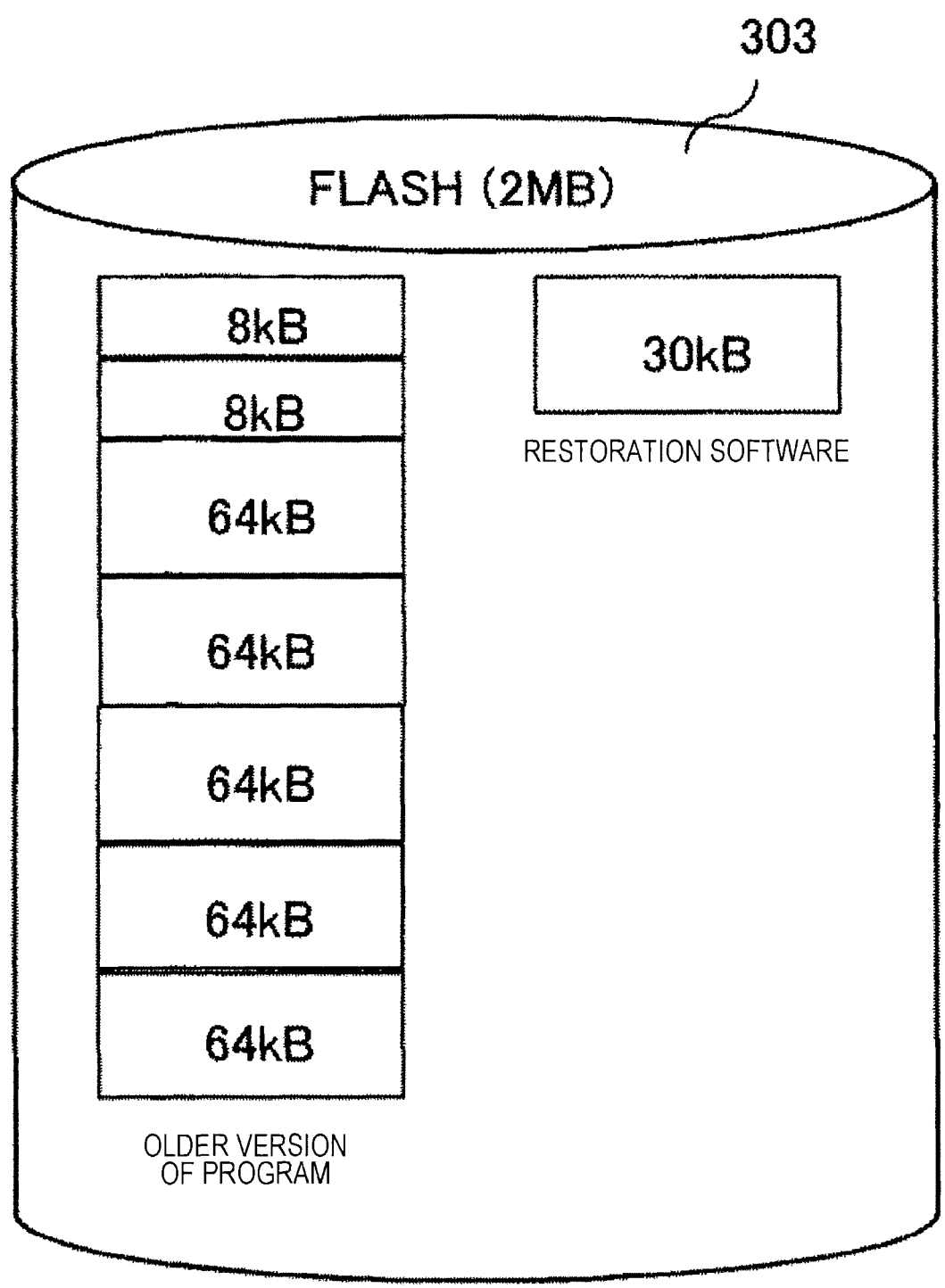
FIG. 5 is a schematic view illustrating an internal configuration of a FLASH memory in the ECU illustrated in FIG. 3.

Next, with reference to FIG. 5, a configuration of the FLASH memory 303 will be described. FIG. 5 is a schematic view illustrating an internal configuration of the FLASH memory 303 of FIG. 3.

The FLASH memory 303 is configured from blocks in different sizes. According to the present embodiment, as an example, the size of the FLASH memory 303 is 2 MB. The FLASH memory 303 has two types of blocks of 8 kB and 64 kB. Here, the block is a minimum unit to delete the data. For example, when 4 kB data is to be written in a 8 kB block, the 4 kB data is written after deleting 8 kB data.

As illustrated in FIG. 5, the FLASH memory 303 stores the older version of the program in the blocks of 8 kB, 8 kB, 64 kB, 64 kB, 64 kB, 64 kB, and 64 kB.

Further, the FLASH memory 303 stores restoration software for restoring a new program in the second area 302b of the SRAM 302 from the data in the first area 302a and the older version of the program already existing in the FLASH memory 303 or restoring a new program by decompressing compressed data in the first area 302a, according to the type of the data temporarily stored in the first area 302a of the SRAM 302.

Figure 6:
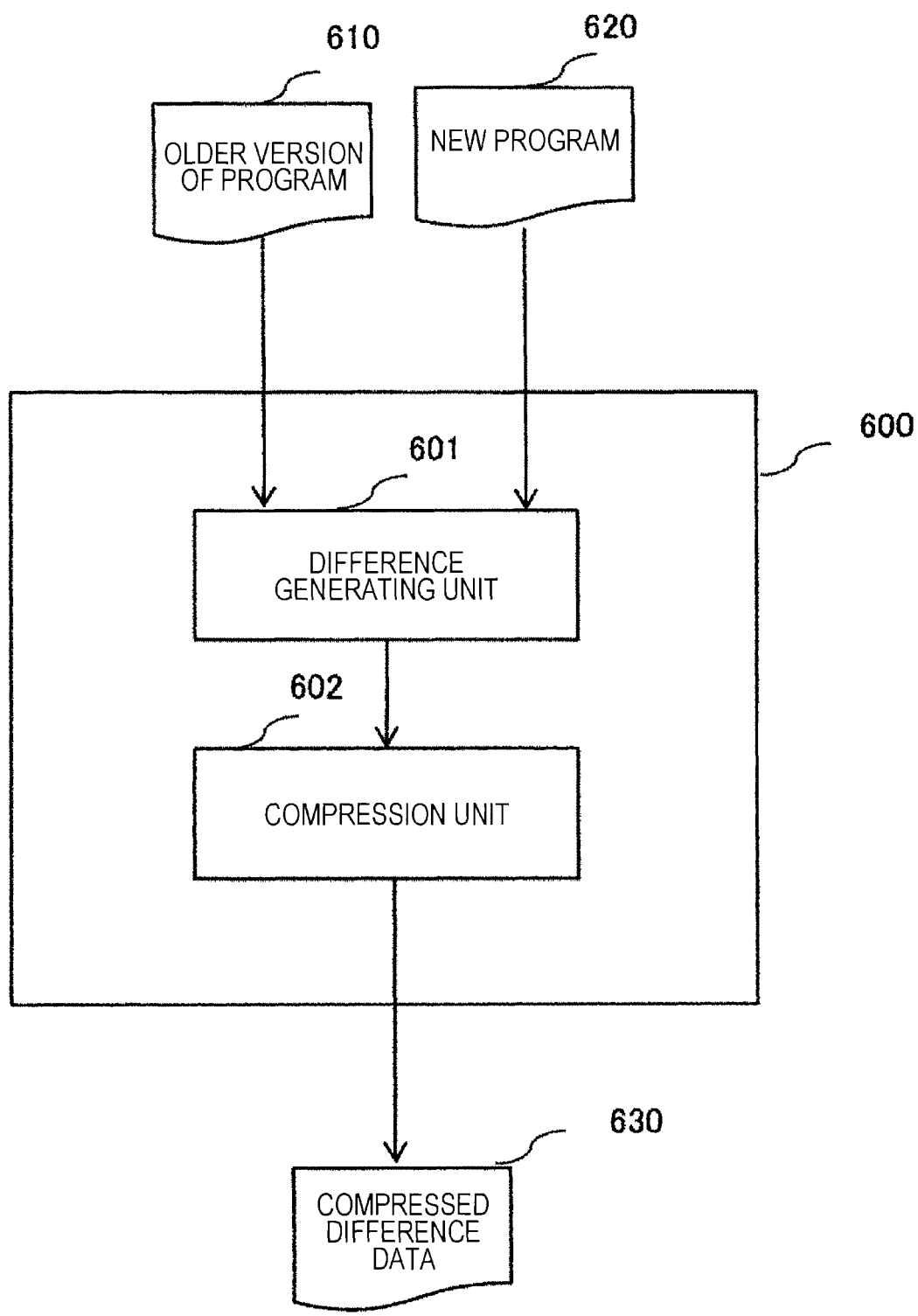
FIG. 6 is a configuration diagram of compressed difference data generating software.

Next, with reference to FIG. 6, an outline of compressed difference data generating software will be described. Here, the computation unit 201 of the PC 1 executes a following process by executing the compressed difference data generating software 600.

The computation unit 201 (the compressed difference data generating software 600) generates difference data 630 by using the input of the older version of the program 610 and new program 620. A difference generating unit 601 generates a difference between the older version of the program and the new program, and a compression unit 602 compresses the difference and generates the compressed difference data 630. In this manner, the difference compression generating software 600 compresses the data to generate compressed difference data in a smaller size, in addition to simply generating the difference.

Figure 7:
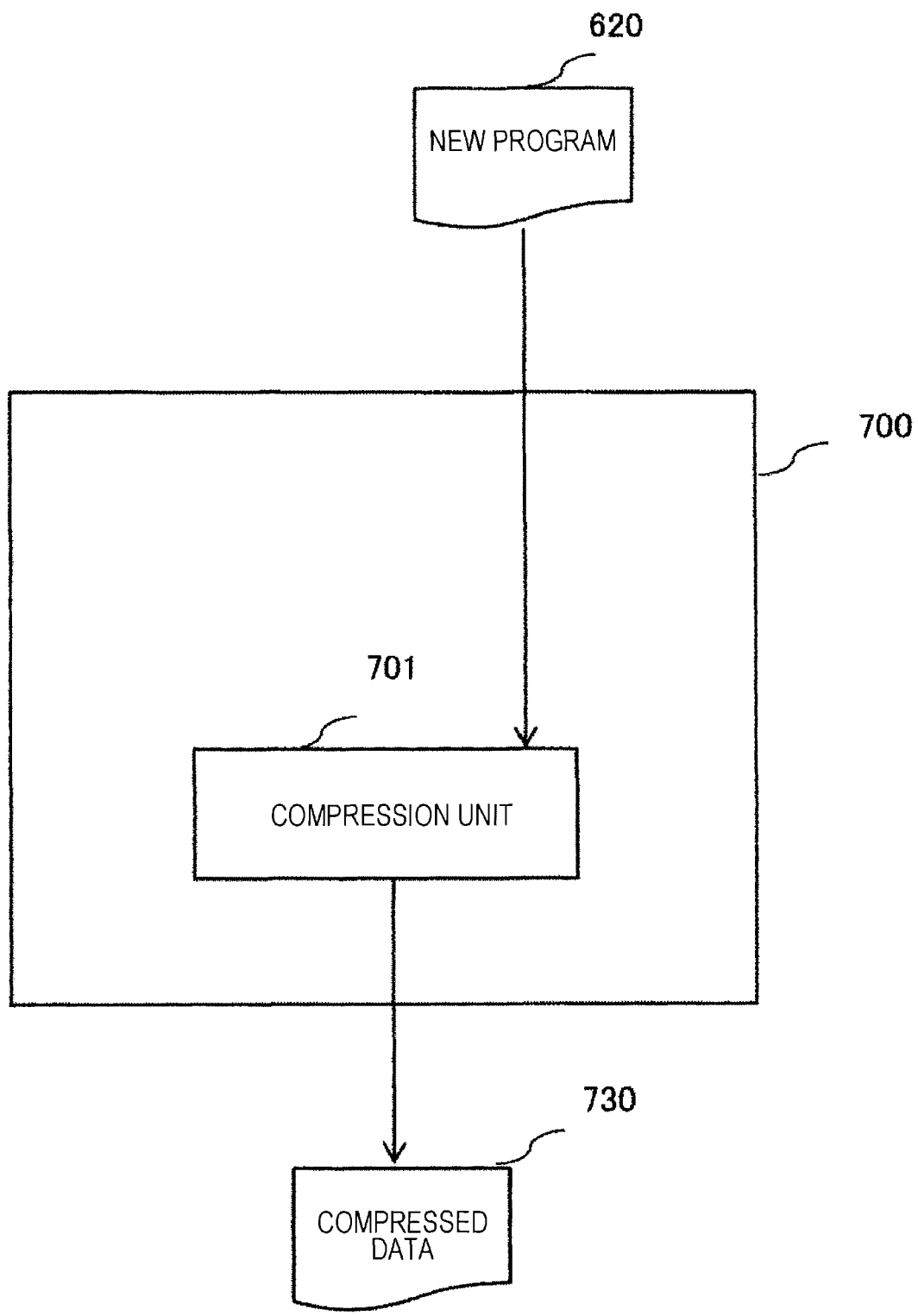
FIG. 7 is a configuration diagram of compressed data generating software.

Next, with reference to FIG. 7, an outline of compressed data generating software will be described. Here, the computation unit 201 of the PC 1 executes a following process by executing the compressed data generating software 700.

The computation unit 201 (the compressed data generating software 700) generates compressed data 730 by using an input of the new program 620. A compression unit 701 has a function for compressing a program. In this manner, the compressed data generating software performs an operation to simply compress the input program and generate compressed data.

Figure 8:
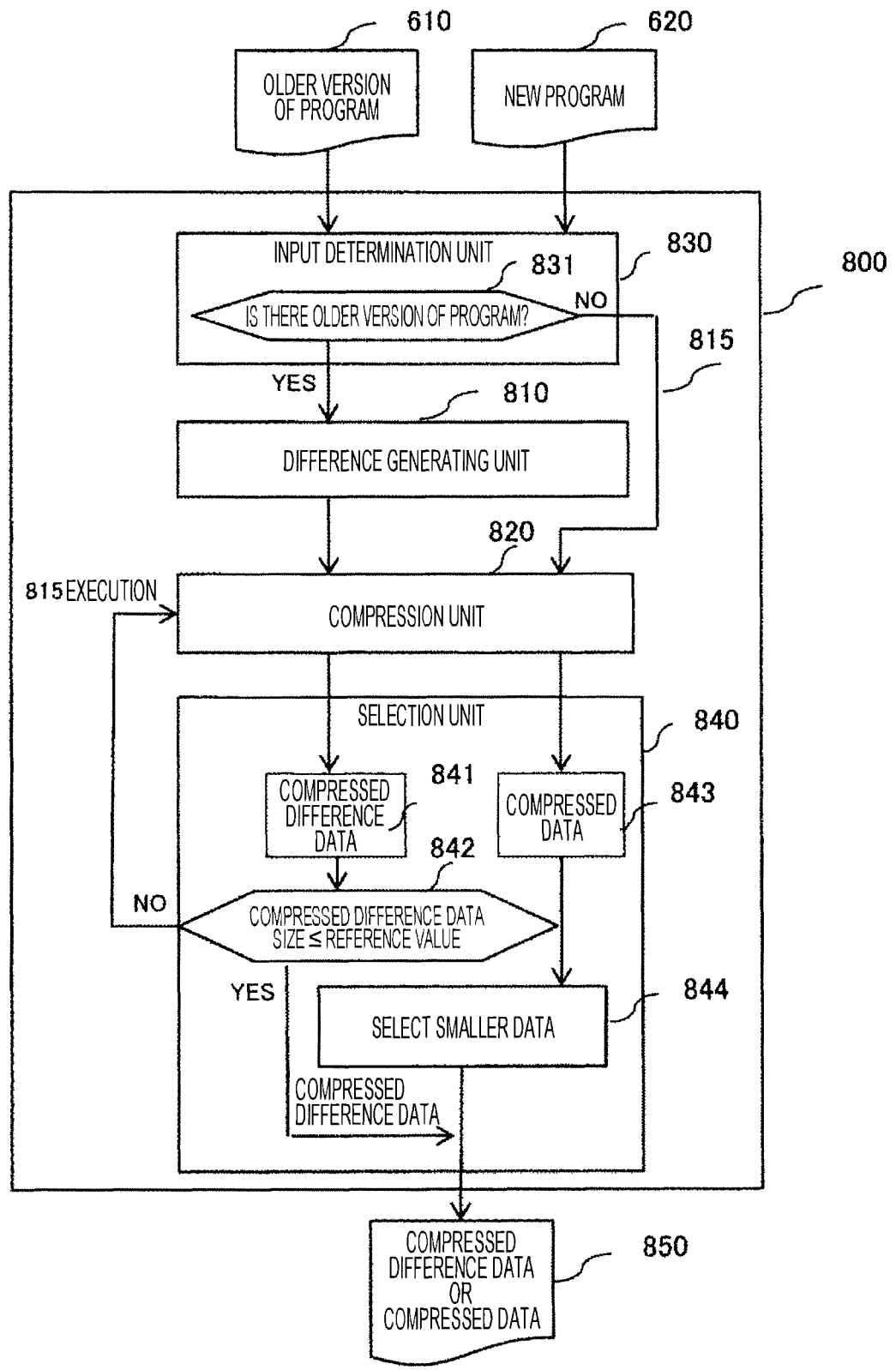
FIG. 8 is a configuration diagram of selection-function-included compressed difference data generating software.

Next, with reference to FIG. 8, selection-function-included compressed difference data generating software 800, which is one example of the present invention, will be described.

When the sizes of the compressed difference data of the older version of the program and the new program and the compressed data of the new program are compared, the compressed difference data is smaller in general. Here, the compressed difference data becomes smaller in size since the information of the older version of the program can be used. However, in a case that the older version of the program and the new program are very different from each other, the compressed data may become smaller since there are so many different parts. Further, when the older version of the program is not stored in the FLASH memory in the ECU 300 (in a case of first writing), compressed difference data cannot be generated.

A configuration and an operation of the selection-function-included compressed difference data generating software 800 illustrated in FIG. 8, which has been invented in view of the above will be described. The selection-function-included compressed difference data generating software 800 has a configuration in which an input determination unit 830 and a selection unit 840 are included, in addition to a difference generating unit 810 and a compression unit 820. In other words, the input determination unit 830 determines, in a determination 831 whether the input includes the older version of the program 610 and new program 620 or the input includes only the new program 620. When there are the older version of the program 610 and new program 620 (831: YES), the difference generating unit 810 generates a difference, generates compressed difference data 841 by compressing the difference in the compression unit 820, and transmits the data to the selection unit 840.

When the size of the compressed difference data 841 is equal to or smaller than a reference value (a threshold value) in a determination 842 (842: YES), the selection unit 840 outputs the compressed difference data 841 as output data 850. When the compressed difference data 841 is larger than the reference value (842: NO), the selection unit 840 instructs the compression unit 820 via 815 to compress the new program 620. The compression unit 820 generates compressed data 843 and temporarily stores the compressed data 843 in selection unit 840. The selection unit 840 selects, by a selection means 844, smaller data of the compressed difference data 841 and compressed data 843 and outputs the selected data as the output data 850.

As a result, compressed difference data or compressed data which is smaller in size can be obtained. On the other hand, when the determination 831 made by the input determination unit 830 is NO, the new program 620 is transmitted to the compression unit 820 via 815 and compressed data 843 is generated. The selection unit 840 selects, by the selection means 844, the compressed data 843 and outputs the compressed data 843 as the output data 850.

As described above, the selection-function-included compressed difference data generating software 800 can generate output data in a smaller size, compared to the compressed difference data generating software 600. Further, even when there is no older version of the program, the new program can be compressed and output. Here, a further simplified configuration may be considered. For example, when the compressed data 843 is generated, the compressed data 843 may be output as the output data 850 without comparing the sizes by the selection means 844. This is because that the selection means 844 may not be needed since it is determined that the size of the compressed difference data is equal to or larger than the reference value in the determination 842. Further, the new program as an input may be a new program of one block among a plurality of divided blocks, and the older version of the program may be an older version of the program in some blocks among the plurality of divided blocks.

Figure 9:
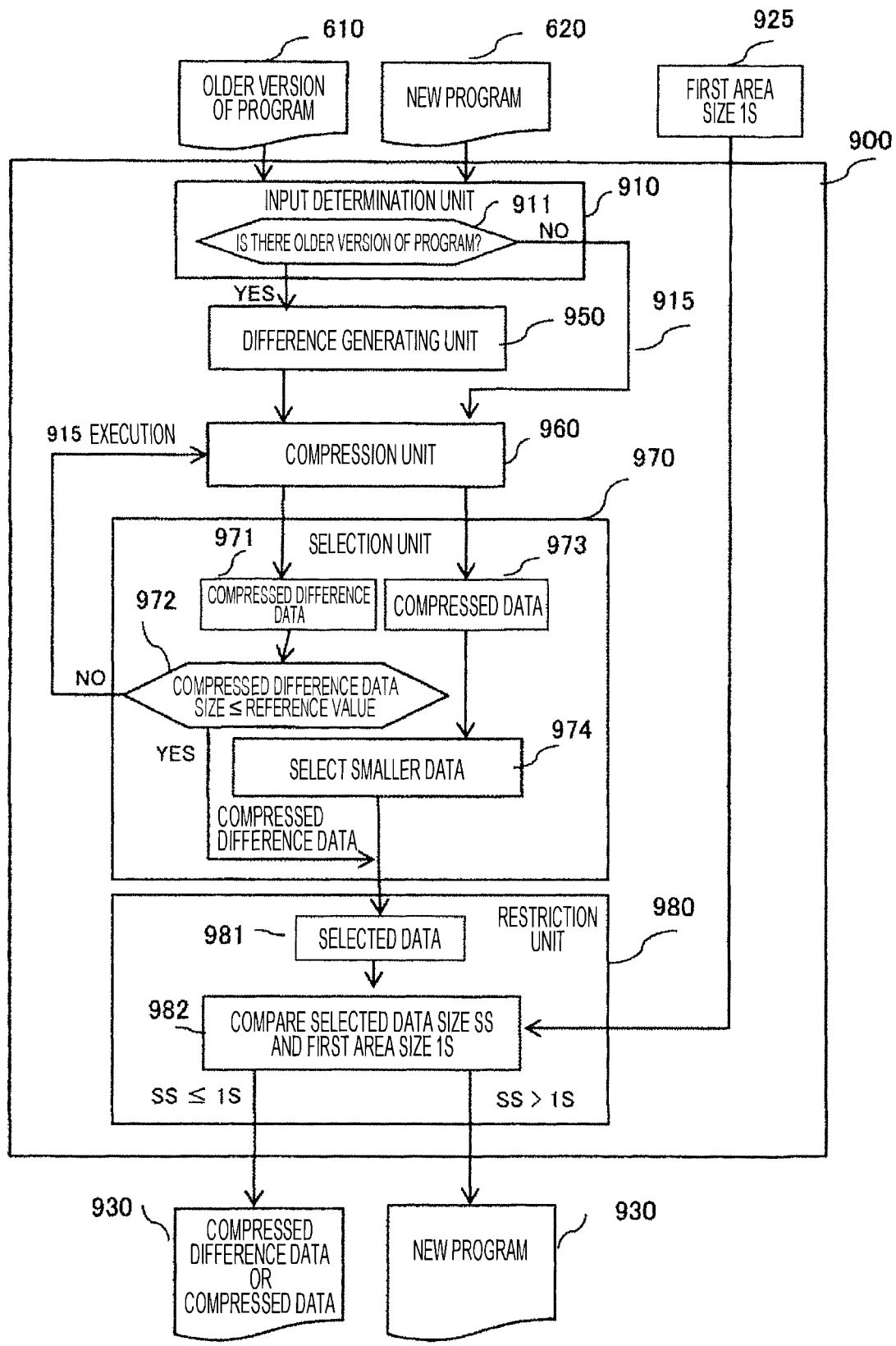
FIG. 9 is a configuration diagram of restriction-function-included compressed difference data generating software.

Next, with reference to FIG. 9, a configuration and an operation of restriction-function-included compressed difference data generating software 900, which is an example of the present invention, will be described.

Firstly, necessity of the restriction function will be explained. The compressed difference data and compressed data are transmitted to the ECU 300 and received in the first area 302a of the ECU 300. However, in a case that the compressed difference data or compressed data is larger than the first area 302a, the whole data cannot be received or restored as a result. This is the necessity of the restriction.

Thus, the restriction-function-included compressed difference data generating software 900 has a configuration including a restriction unit 980 in addition to an input determination unit 910, a difference generating unit 950, a compression unit 960, and a selection unit 970. In the following, a process operation will be explained. As an input, there is a first area size 1S (925) of the ECU 300, which is information used in the restriction unit 980.

Firstly, the input determination unit 910 determines, in a determination 911, whether the input includes an older version of the program 610 and a new program 620 or only new program 620. When there are the older version of the program 610 and new program 620 (911: YES), the difference generating unit 950 generates a difference and the compression unit 960 generates compressed difference data 971 which is a compressed difference. When the size of the compressed difference data is equal to or smaller than the reference value in the determination 972, the selection unit 970 transmits the compressed difference data 971 to the restriction unit 980 as selected data 981.

When the size of the compressed difference data 971 is larger than the reference value (972: NO), an instruction to compress the new program 620 is sent to the compression unit 960 via 915. The compression unit 960 compresses the new program 620 and generates compressed data 973. The selection means 974 of the selection unit 970 transmits smaller data of the compressed difference data 971 and compressed data 973 to the restriction unit 980 as selected data 981.

The restriction unit 980 compares, in a restriction means 982, the size (SS) of the selected data 981 with the first area size (1S) and outputs the selected data 981 as output data 930 when the selected data 981 is smaller (SS≤1S). Here, the selected data 981 is one of the compressed difference data 971 and compressed data 973. On the other hand, the size of the size (SS) of the selected data 981 is larger than the first area size (1S) (SS>1S), the new program is output as it is as the output data 930.

In a case that the new program is output, the new program may be divided and transmitted to the first area and written in the plurality of blocks in the FLASH memory after data in those blocks is deleted.

Next, a flowchart that the PC 1 generates compressed difference data or compressed data by using the selection-function-included compressed difference data generating software 800 of FIG. 8 and transmits the generated data to the server 2 will be explained with reference to FIG. 10.

A basic concept is not that compressed difference data or compressed data is generated for all the entire older version of the program and new program, but that the old version of the program and new program are divided into a plurality of blocks and compressed difference data or compressed data is generated for the new program placed in one of the blocks and the older version of the program placed in one or more of the blocks in the FLASH memory 303 of the ECU 300.

The computation unit 201 of the PC 1 firstly checks whether or not the older version of the program exists in step S10. When there is no older version of the program (S10: NO), the new program is divided into sizes of blocks B(J) (J=1, 2, ..., N) in the FLASH memory 303 of the ECU 300 in step S40. In step S45, block B(J) is selected and the process is repeated until J becomes equal to N in step S60. In step S50, by using the selection-function-included compressed difference data generating software 800, compressed data is generated by compressing the new program in selected block B(J). Further, the size of the compressed data is also stored.

Next, in step S55, the compressed data in B(J) is transmitted to the server 2. In step S60, it is checked whether or not the processes for all the blocks are completed and, when it is J=N (S60: YES), the process ends. When it is J≠N, it is set as J=J+1, the process returns to step S45 and the processes are repeated.

In step S10, when there is the older version of the program (S10: YES), the new program and older version of the program are divided into sizes of the blocks B(I) (I=1, 2, ..., N) in the FLASH memory 303 of the ECU 300 in step S15. Here, the memory unit 205 of the PC 1 stores sizes of the respective blocks B(I) in the FLASH memory 303 of the ECU 300, addresses of the blocks B(I), and an ID (identifier) of the ECU 300.

The computation unit 201 of the PC 1 performs a loop initialization (I=1) related to the blocks B(I) (step S20). In step S25, the computation unit 201 of the PC 1 inputs the new program in the block B(I) and the older version of the program in the I number of blocks B(I), B(I-1), B(I-2) ..., B(1), and executes the selection-function-included compressed difference data generating software 800. As a result, compressed difference data or compressed data of the block B(I) is generated. The size thereof is also stored. Then, in step S30, the compressed difference data or compressed data in the block B(I) is transmitted to the server 2. Next, in step S35, it is checked whether or not all the blocks are processed and, when it is I=N, the process ends. When it is I≠N, it is set as I=I+1 and the process returns to step S20 to repeat the processes.

With the above configuration, for each block size in the FLASH memory 303 of the ECU 300, compressed difference data or compressed data, the data size thereof, the block size, and a block address can be transmitted to the server 2.

Next, as another example of the invention, a flowchart will be described with reference to FIG. 11, in which the PC 1 transmits compressed difference data, compressed data, or the new program as it is to the server 2 by using the restriction-function-included compressed difference data generating software 900 of FIG. 9. The basic concept is, similarly, that the new program and the older version of the program are divided into a plurality of blocks and compressed difference data of the new program placed in one of the blocks and the older version of the program placed in one or more of the blocks in the FLASH memory 303 of the ECU 300 or compressed data are generated, without generating compressed difference data of the entire new program and older version of the entire program or compressed data of the entire new program.

In step S70, the computation unit 201 of the PC 1 checks whether or not there is an older version of the program. When there is no older version of the program (S70: NO), the new program is divided into blocks and compressed data or the new program, as it is, is transmitted to the server 2 in step S100 and following steps.

Firstly, in step S100, the new program is divided into sizes of blocks B(J) (J=1, 2, ..., N) in the FLASH memory 303 of the ECU 300. In step S105, block B(J) is selected and the process is repeated until J becomes equal to N in step S120. In step S110, the new program in selected block B(J) and the first area size 1S (925 in FIG. 9) are input and the restriction-function-included compressed difference data generating software 900 is executed.

As a result, the compressed data or new program as it is of block B(J) is output. Further, the data size thereof is also stored. In next step S115, the compressed data or new program as it is of B(J) is transmitted to the server 2. In step S120, it is checked whether or not the processes for all the blocks are completed and, when J is equal to N (J=N) (S120: YES), the process ends. When it is J≠N, it is set as J=J+1, and the process returns to step S105 to repeat the process.

When there is an older version of the program in step S70 (S70: YES), the new program and older version of the program are divided into the sizes of blocks B(I) (I=1, 2, . . . , N) in the FLASH memory 303 of the ECU 300 in step S75. Here, the memory unit 205 of the PC 1 stores each size of block B(I) in the FLASH memory 303 of the ECU 300, an address of block B(I), and an identifier (ID) of the ECU 300. The computation unit 101 of the PC 1 performs loop initialization (I=1) related to block B(I) (step S80).

In step S85, the computation unit 201 of the PC 1 inputs the new program placed in block B(I), the older versions of the program placed in the I number of blocks B(I), B(I-1), B(I-2), . . . , and B(1), and the first area size 1S (925 in FIG. 9) and executes the restriction-function-included compressed difference data generating software 900. As a result, the compressed difference data, compressed data, or new program, as it is, in B(I) is output, and the output data is transmitted to the server 2 in step S90. Next, in step S95, it is checked whether or not all blocks B(I) (I=1 to N) are processed and, when it is I=N, the process ends. When it is I≠N, it is set as I=I+1 and the process returns to step S80 to repeat the process.

With the above configuration, for each block size in the FLASH memory 303 of the ECU 300, compressed difference data, compressed data, or new program as it is, a data size thereof, a block size, a block address can be transmitted to the server 2.

Figure 10:
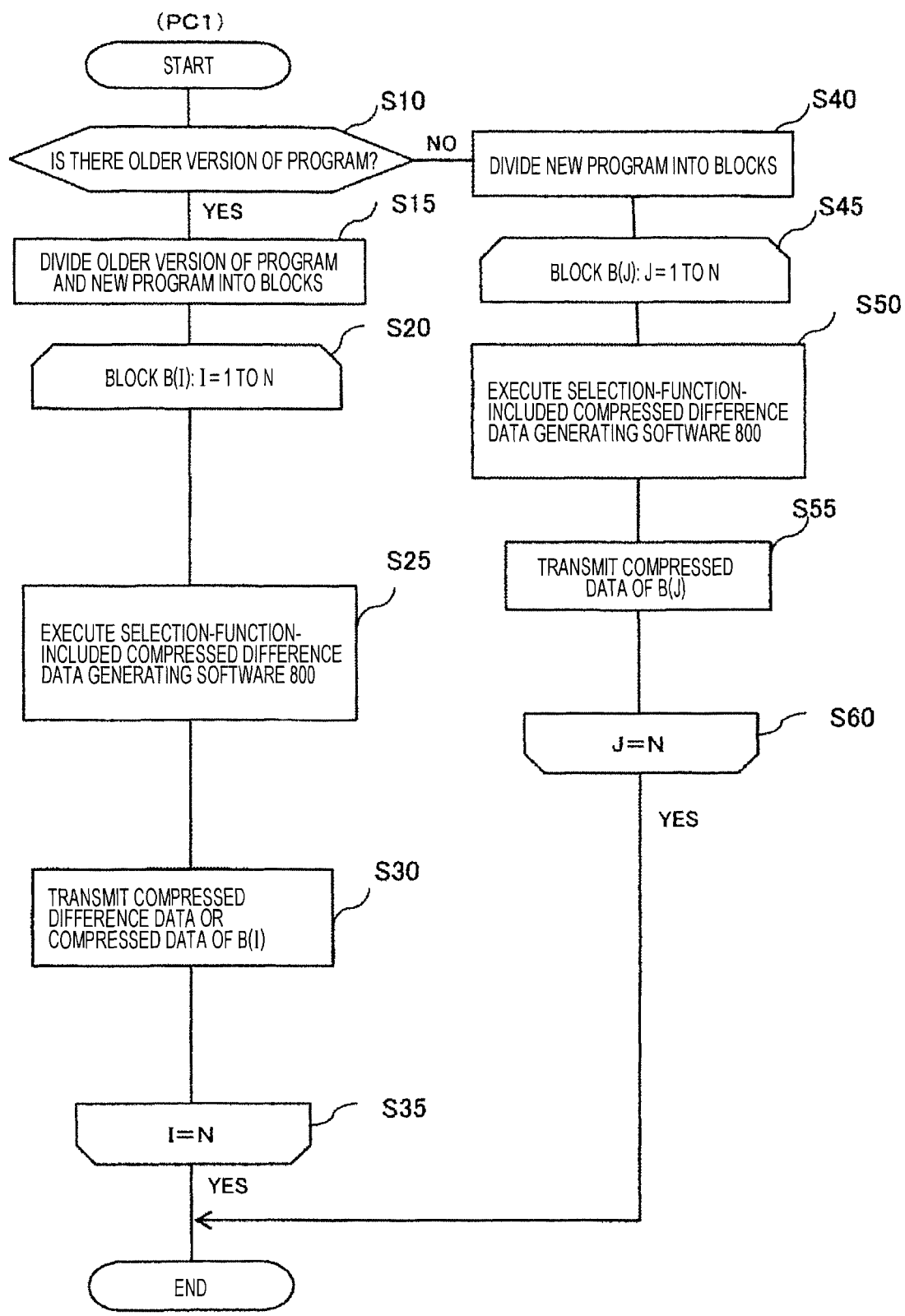
FIG. 10 is a flowchart of the selection-function-included compressed difference data generating software, which illustrates a process of the PC of FIG. 1.
Figure 11:
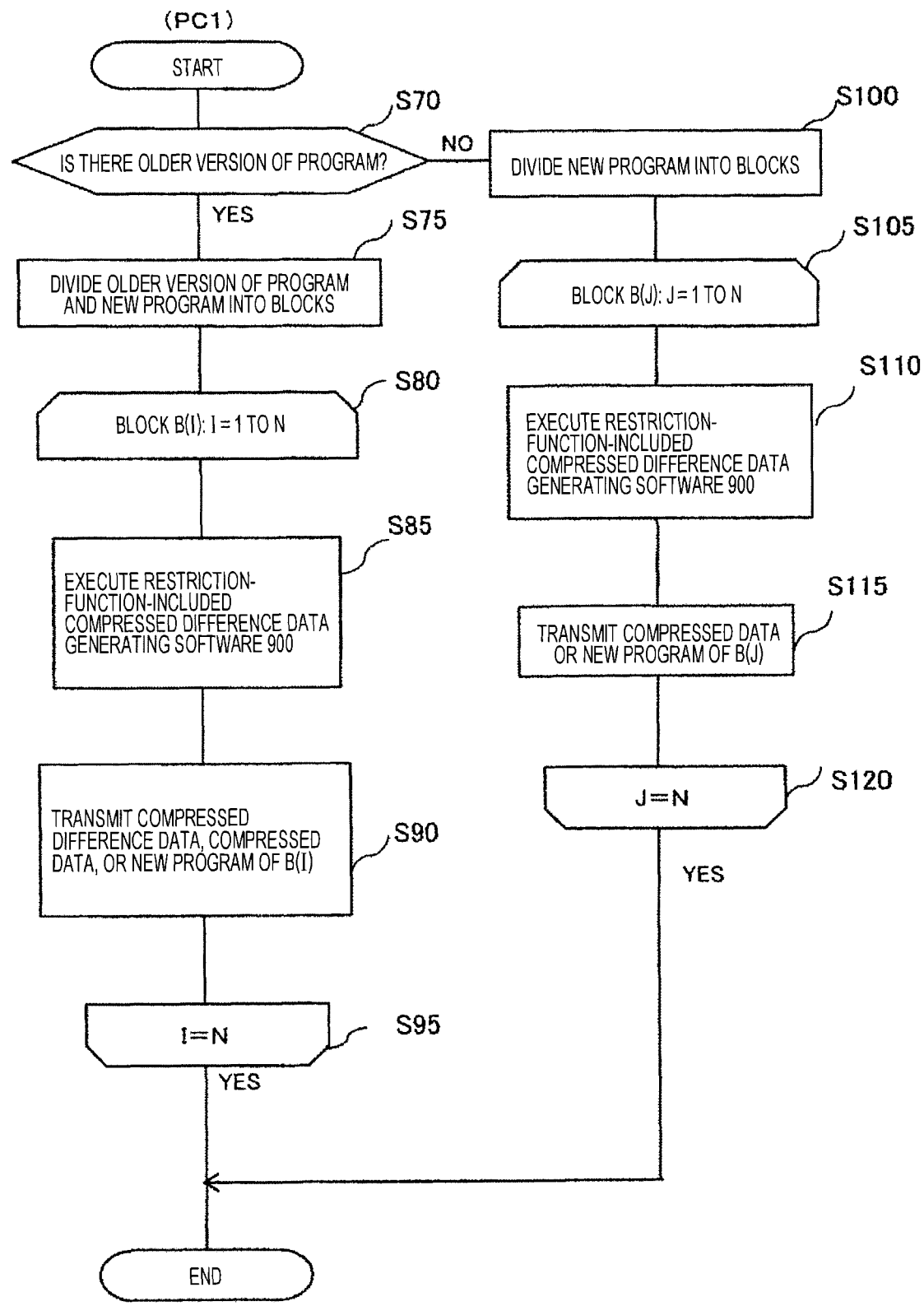
FIG. 11 is a flowchart of the restriction-function-included compressed difference data generating software, which illustrates a process of the PC of FIG. 1.

In the above described process flows of the PC 1 in FIGS. 10 and 11, the new program and the older version of the program are divided into the same units of blocks B(I) in the FLASH memory of the ECU 300 and compressed difference data is generated from the new program placed in one of the divided blocks and the older version of the program placed in more than one of the blocks. The reason of the above process will be explained with reference to FIGS. 12, 13, 13A, and 13B.

Figure 12:
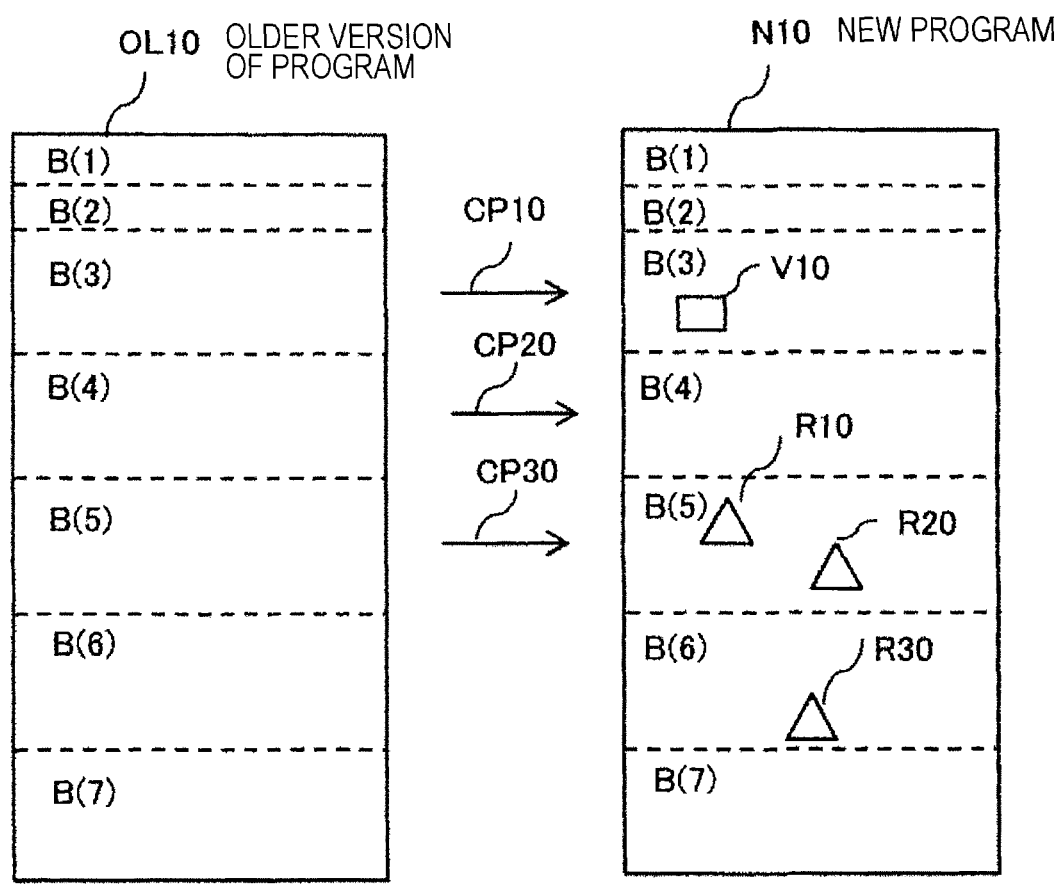
FIG. 12 illustrates an outline of selecting a block for a new program with a small change.

OL10 in FIG. 12 illustrates a configuration that the older version of the program is divided into blocks B(1) to B(7) in the FLASH memory of the ECU. On the other hand, N10 illustrates a configuration that the new program is divided into blocks B(1) to B(7) in the FLASH memory of the ECU. V10 in the new program represents a part which is added or modified. In other words, V10 is a part where an addition or a modification is made in the older version of the program.

On the other hand, R10, R20, and R30 represent microcomputer instruction sequences in which reference address of a variable number in V10 is changed according to the addition or change in V10. In other words, since the address of the variable number is changed due to the addition or change in V10 and the current address of the variable number is changed accordingly, the reference addresses in R10 to R30 are also changed at the same time. Thus, in the new program N10, there is the addition or modification in V10 in block B(3), modifications are made in R10 and R20 in block B(5), and a modification is made in R30 in block B(6).

It should be noted there that the actual modification is made only in V10, and, the modification does not cause a big change in the entire new program although there are secondary modification in R10 to R30 due to the modification of V10. Thus, in a case of such a small modification, even when compressed difference data is generated from the older version of the program and new program in the same units of blocks B(I), the data size thereof often becomes equal to or smaller than the reference value.

Thus, when a program is updated due to a software failure, compressed difference data in a sufficiently small size can be obtained by dividing the older version of the program and new program into blocks and generating the compressed difference data from the same blocks.

Figure 13:
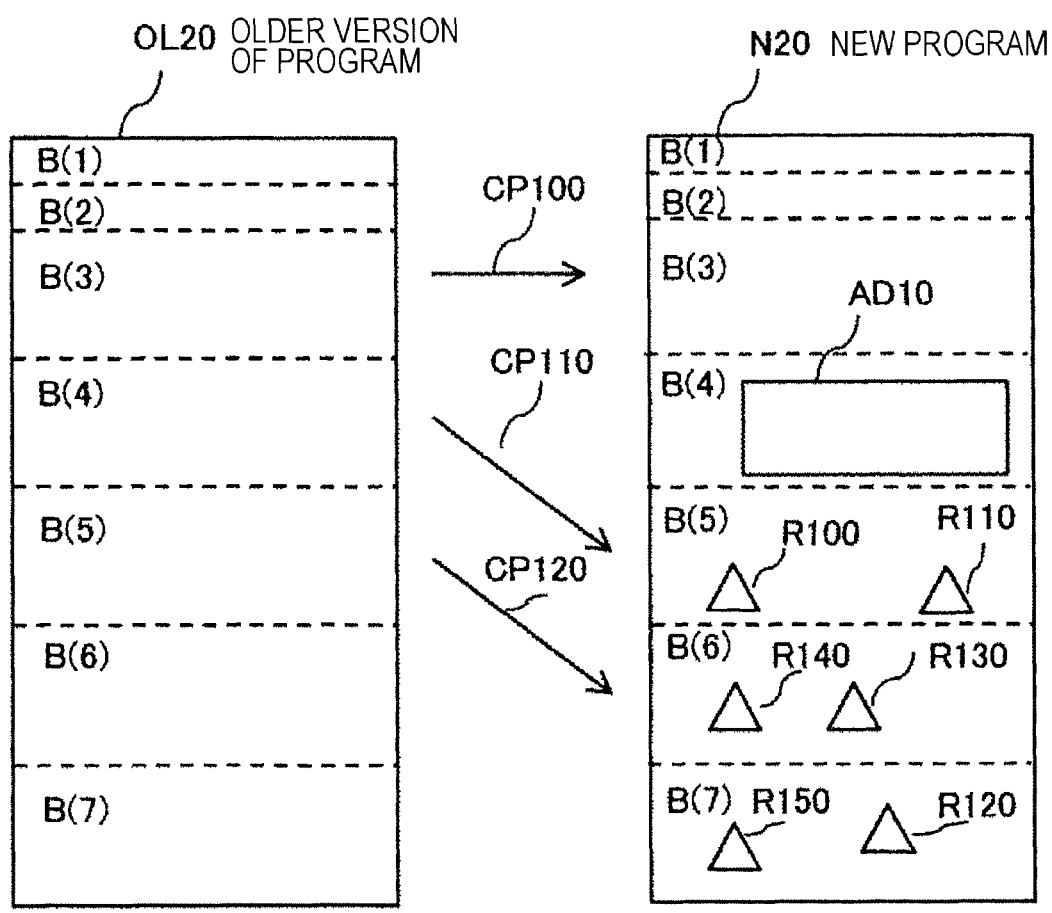
FIG. 13 illustrates an outline of selecting a block for a new program to which a large program is added.

On the other hand, FIG. 13 is a diagram illustrating a new program N20 in which there is a large difference from an older version of a program OL20. Here, in B(4) of N20, there is a large added/modified part AD10. R100, R110, R120, R130, R140, and R150 represent changes of reference variable addresses caused by the addition/modification in AD10. Here, the new program in block B(3) of N20 is the same as the program in B(3) of the older version of the program OL20 since there is no modification; however, the new program in block B(4) of N20 is different to a great degree from the older version of the program in block B(4) of OL20.

The following new program in block B(5) of N20 is different to a great degree from the older version of the program in block B(5) of OL20 and may often be similar to the older version of the program in block B(4) of OL20. This is because that the older version of the program in B(4) of OL20 may be shifted to the part of the new program in B(5) of N20 due to an addition of AD10. Thus, regarding a method to select a proper block to generate compressed difference data, the same blocks cannot be simply used.

Here, CP100 in FIG. 13 indicates that compressed difference data is preferably generated from the older version of the program and new program in B(3). On the other hand, CP110 in FIG. 13 indicates that the new program in B(5) is similar to the older version of the program in B(4), and CP120 in FIG. 13 indicates that the new program in B(6) is similar to the older version of the program in B(5). Accordingly, this indicates that the size of the compressed difference data can be made smaller by generating compressed difference data from the older version of the program in B(4) and the new program in B(5) and generating compressed difference data from the older version of the program in B(5) and the new program in B(6).

The above describes that the details of the outline of selecting an older version of the program in block B(I), which is most preferable to the new program in blocks B (K) (K=1 to N).

Although the outline of selecting only one older block B(I) which is most preferable to the block (K) of the new program has been described, the number of older blocks B(I) may be more than one.

Figure 13A:
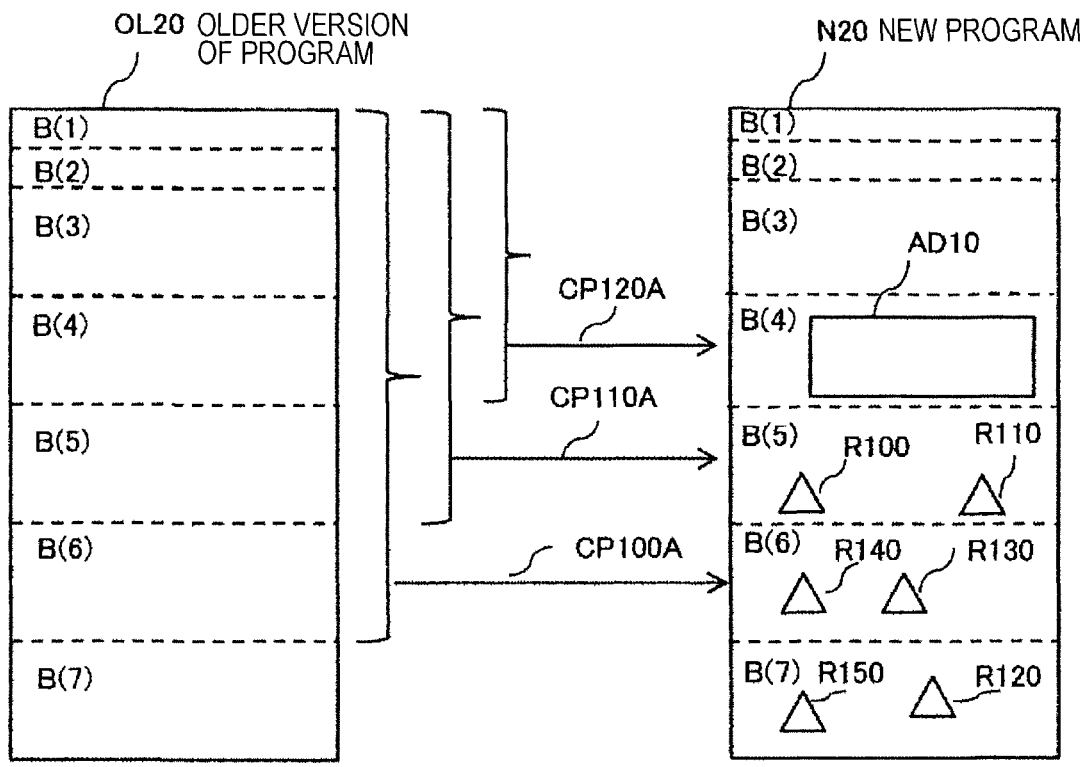
FIG. 13A illustrates an outline of selecting more than one older blocks for a new block in which a large program is added.

FIG. 13A is a diagram explaining an outline of selecting a plurality of older blocks B(I) (I=1 to K) most preferable to new block B(K) in a case that a large program is added to the new program N20. In other words, regarding a case that a large program AD10 is added to new block B(4), it has been described that the most preferable older block corresponding to the new block B(5) is B(4); however, conversely, more than one older blocks B(1) to B(4) including the older block B(4) may be selected.

In general, since a difference generating algorithm finds out a similar binary code in the older block and generates a difference, a smaller difference can be generated with an older version of a larger program. Thus, the older blocks which are most preferable to the new block B(6) are six older blocks B(1) to B(6) indicated by CP100A in FIG. 13A, the older blocks which are most preferable to the new block B(5) are B(1) to B(5) indicated by CP110A in FIG. 13A, and the older blocks which are most preferable to the new block B(4) are B(1) to B(4) indicated by CP120A in FIG. 13A.

In this manner, in a case that a large program is added, it is important to generate compressed difference data in descending order of the block numbers and to select more than one blocks in ascending order of block numbers as the older blocks corresponding to the block of the new program. By selecting the blocks of the older version of the program in this manner, the older version of the program which is used for restoring can be selected even if the block is rewritten in the new program.

Figure 13B:
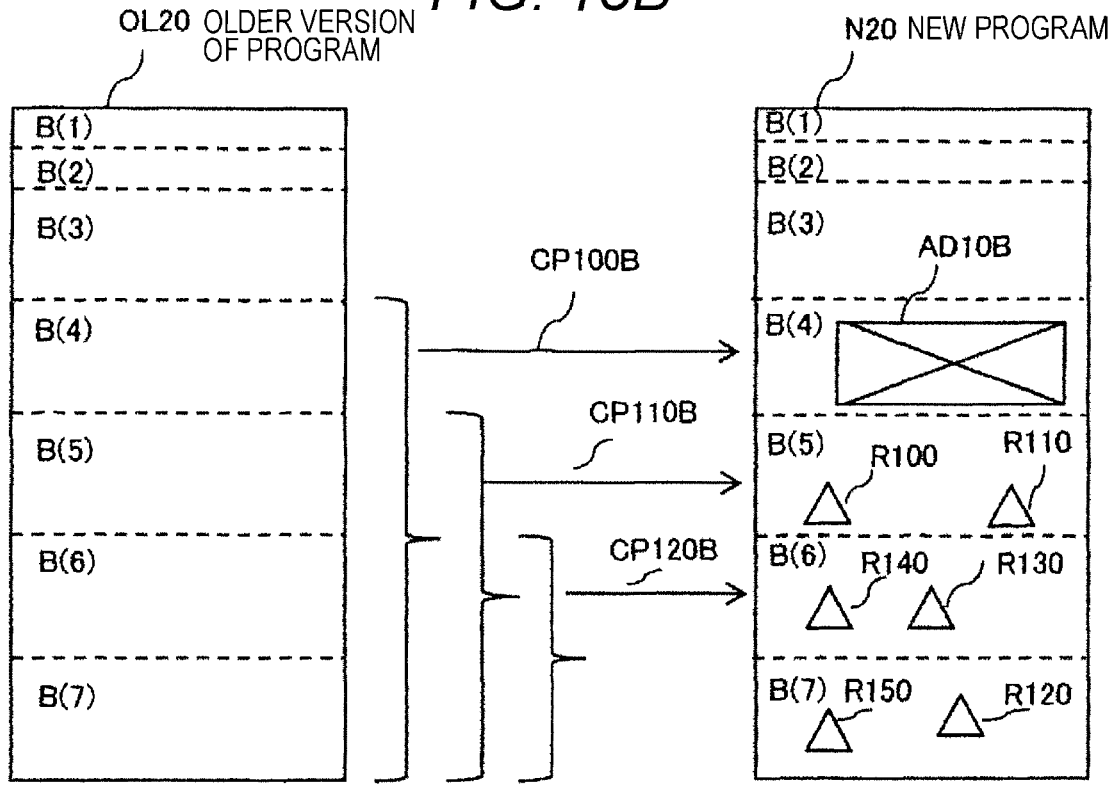
FIG. 13B illustrates an outline of selecting more than one older blocks for a new program in which a large program is deleted.

FIG. 13B is a diagram illustrating an outline of selecting a plurality of blocks B(I) (I=N to K) as the older version of the program, which is most preferable to the block B(K) of the new program, when a large program is deleted from the older version of the program OL20.

Block B(4) of the new program N20 illustrates that a large program AD10B is deleted. Accordingly, the diagram illustrates that the content is similar to the content of the block B(5) of the older version of the program OL20. As a result, it can be considered that the block B(6) of OL20 is the most preferable to the block B(5) of N20. Thus, as the block of the older version of the program preferable to block B(5) of N20, a plurality of blocks B(5) to B(7) including block B(6) of OL20 may be selected. In general, since a difference generating algorithm finds out a binary code similar to the older version of the program and generates a difference, a smaller difference can be generated with an older version of a larger program.

Thus, the plurality of blocks of OL20, which is most preferable to block B(4) of N20, are four older blocks of B(4) to B(7) indicated by CP100B, the plurality of blocks OL20 most preferable to block B(5) of N20 are B(5) to B(7) indicated by CP110B, and the plurality of blocks of OL20 most preferable to block B(6) of N20 are B(6) to B(7) indicated by CP120B. In this manner, when a large program is deleted, it is important to generate compressed difference data in ascending order of block numbers and select a plurality of blocks having a larger number in descending order as a selection of a plurality of older blocks corresponding to the new block. By selecting the blocks of the older version of the program in this manner, the older version of the program which is used for restoring can be selected even if the block is rewritten in the new program.

Figure 14:
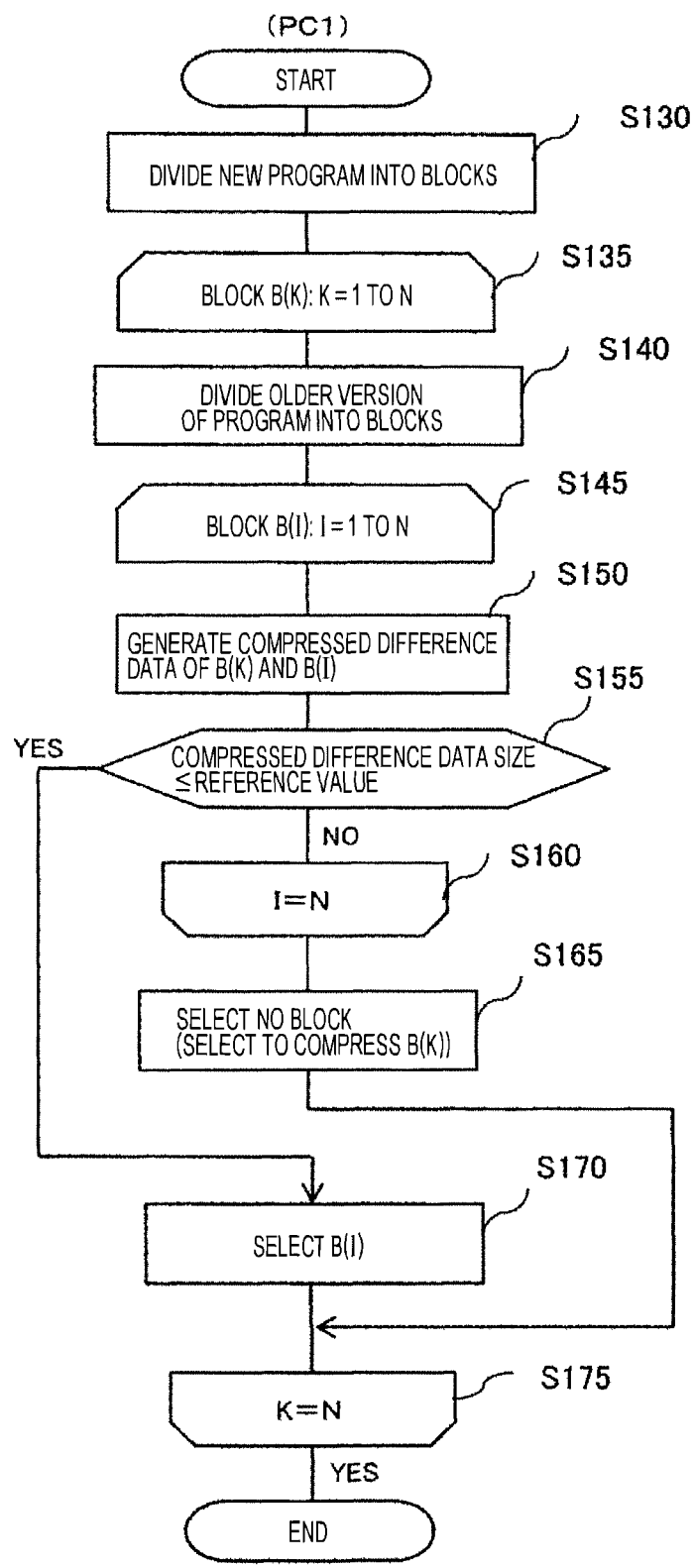
FIG. 14 is a flowchart of selecting a block.
Figure 14A:
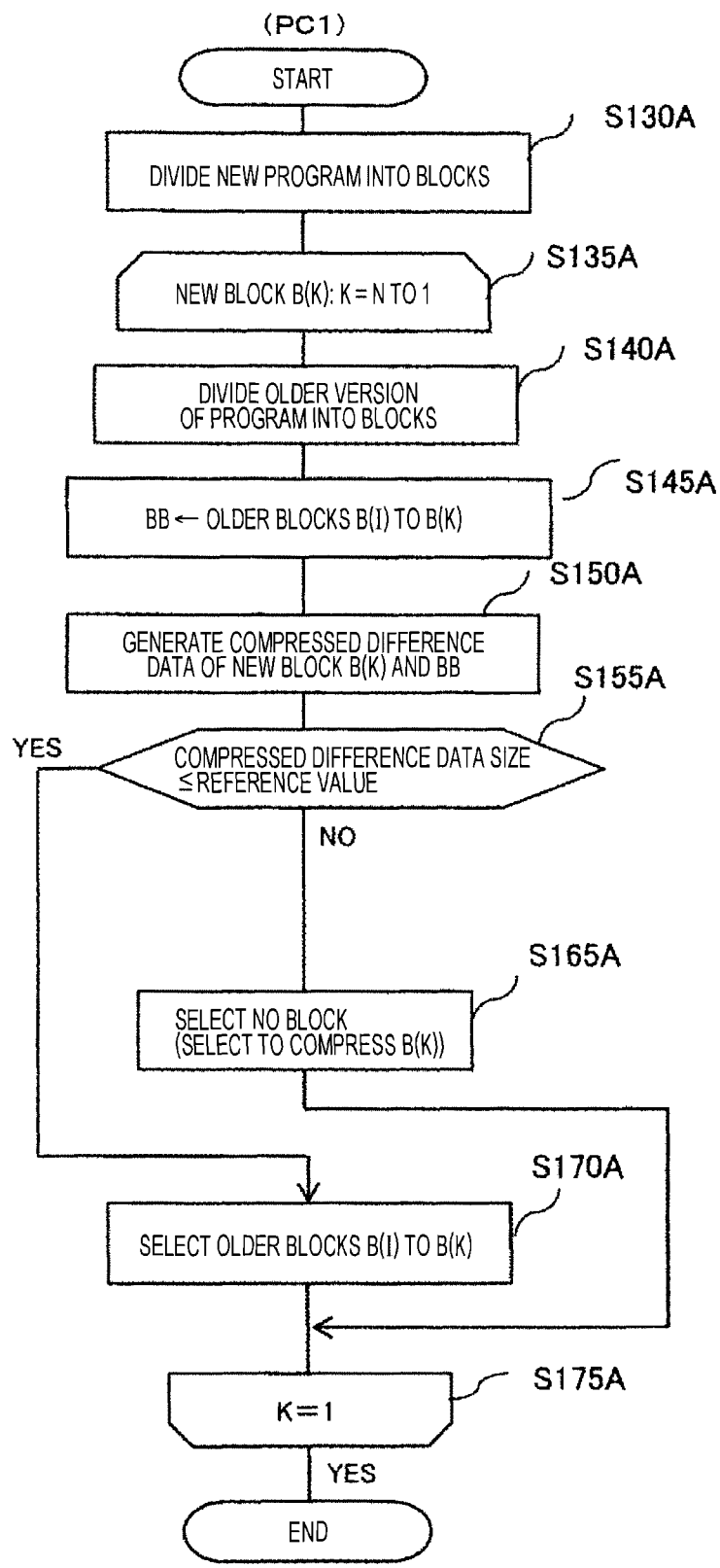
FIG. 14A is a flowchart of selecting more than one older blocks for a new program in which a large program is added.

FIGS. 14, 14A, and 14B illustrate flowcharts that the PC 1 selects block B(I) or a plurality of blocks of the older version of the program preferable to the block B(K) of the new program, according to the above described outlines of FIGS. 13, 13A, and 13B. With this configuration, an older block or a plurality of older blocks which are most preferable to generate the compressed difference data can be selected.

Firstly, FIG. 14 illustrates a process flow of selecting the older version of the program in block B(I), which is most preferable to the new program in block B(K) (K=1 to N) of FIG. 13.

In step S130, the computation unit 201 of the PC 1 divides the new program into blocks B(K) (K=1 to N) in the FLASH memory 303 of the ECU 300. Next, in step S135, the new program of the block B(K) (K=1: initial value) is selected. In step S140, the older version of the program is divided into blocks B(I) (I=1 to N) in the FLASH memory 303 of the ECU 300. In step S145, block B(I) (I=1: initial value) is selected and, in step S150, compressed difference data of B(K) and B(I) are generated. Next, in step S155, the compressed difference data size and the reference value are compered and, when the compressed difference data size is equal to or smaller than the reference value (step S155: YES), the older version of the program in block B(I) is selected in step S170. On the other hand, when the compressed difference data size is larger than the reference value (step S155: NO), it is set as I=I+1 in step S160 and the process returns to step S145 to repeat the process. As a result of the comparison between all blocks B(I) and the older version of the program in step S155, in a case that the result is NO, since it is determined whether I=N in step S160, the process in step S165 is executed to select no block (select to compress B(K)). Next, in step S175, it is checked whether or not the process for all B(K) (K=1 to N) is completed and, in a case that it is K=N, the process ends. In a case that it is K≠N, it is set as K=K+1, the process returns to step S135 to repeat the process.

With the above configuration, the older version of the program in the most preferable block can be selected for each B(K) (K=1 to N).

FIG. 14A is a flowchart of selecting a plurality of older blocks for a new program to which a large program is added.

In step S130A, the computation unit 201 of the PC 1 divides the new program into blocks B(K) (K=N to 1) in the FLASH memory 303 of the ECU 300. Next, in step S135A, the new program in block B(K) (K=N: initial value) is selected. In step S140A, the older version of the program is divided into blocks B(I) (I=1 to N) in the FLASH memory 303 of the ECU 300.

In step S145A, the older version of the program in the K number of blocks BB (BB=B(1) to B(K)) is selected and, in step S150A, compressed difference data of the new program in B(K) and the older version of the program in BB is generated. Next, in step S155A, the compressed difference data size and the reference value are compared and, when the compressed difference data size is equal to or smaller than the reference value (step S155A: YES), the older version of the program in the blocks B(1) to B(K) is selected in step S170A. On the other hand, when the compressed difference data size is larger than the reference value (step S155A: NO), no block (compression of the new program in B(K)) is selected in step S165A and one is extracted from K (K=K−1) in step S175A and the process returns to step S135A to repeat the process. Here, when K is one (K=1), the process ends. In this manner, starting with the new program in block B(N) of the last block number N, the older version of the program in the plurality of blocks (B(1) to B(K)) corresponding to the new program in B(K) is selected and the compressed difference data thereof is generated.

Further, the order to decode data from the compressed difference data and the older version of the program may be started with the last block.

FIG. 14B is a flowchart of selecting a plurality of older blocks in a case that a large program is deleted from a new program.

In step S130B, the computation unit 201 of the PC 1 divides the new program into blocks B(K) (K=1 to N) in the FLASH memory 303 of the ECU 300. Next, in step S135B, the new program of block B(K) (K=1: initial value) is selected. In step S140B, the older version of the program is divided into blocks B(I) (I=1 to N) in the FLASH memory 303 of the ECU 300.

In step S145B, the older version of the program in a plurality of blocks BB (BB=B(K) to B(N)) is selected and, in step S150B, compressed difference data of the new program in B(K) and the older version of the program in BB is generated. Next, in step S155B, the compressed difference data size and the reference value are compared and, when the compressed difference data size is equal to or smaller than the reference value (step S155B: YES), the older version of the program in block B(K) to B(N) is selected in step S170B. On the other hand, when the compressed difference data size is larger than the reference value (step S155B: NO), no block (compression of the new program in B(K)) is selected in step S165B, it is set as K=K+1 in step S175B, and the process returns to step S135B to repeat the process. Here, in a case that it is K=N, the process ends. In this manner, starting with the new program in block B(1) having the first block number 1, the older version of the program in the plurality of blocks (B(K) to B(N)) corresponding to the new program in B(K) is selected, and compressed difference data thereof is selected.

Further, the order of decoding from the compressed difference data and the older version of the program may be started with the first block.

The above explains in detail a method to select the older version of the program in a plurality of blocks most preferable to the new program in a block. Here, in the examples described in FIGS. 14A and 14B, compressed difference data is a compressed data of a difference between first data (the older version of the program) corresponding to a plurality of blocks and second data (new program) corresponding to one block. Here, the first data includes at least one piece of data obtained by dividing the older version of the program into a size of a block and the second data includes one piece of data obtained by dividing the new program into the size of the block.

Next, with reference to FIG. 15, an operation of the server 2 will be described. FIG. 15 is a flowchart illustrating a process of the server 2 of FIG. 1.

In response to a request from the PC 1, the computation unit 201S of the server 2 receives, by the communication unit 204, data (the compressed difference data, compressed data, or new program as it is) in blocks B(K) (K=1 to N) from the PC 1 (step S180). The computation unit 201S of the server 2 stores the data received from the PC 1 to the memory unit 205 (step S185). Here, the computation unit 201S of the server 2 performs a processes from steps S180 to S185 on all the blocks B(K) (K=1 to N).

Next, the computation unit 201S of the server 2 transmits data of B(K) (K=1 to N) stored in the memory unit 205 to the gateway 310 in response to a trigger, which is a predetermined event (step S190). The predetermined event is, for example, a request from the gateway 310 at a predetermined timing, a request from the gateway 310 caused by user's predetermined operation, or the like.

Next, an operation by the gateway 310 will be explained. FIG. 16 is a flowchart illustrating a process by the gateway 310 of FIG. 3.

In response to a request from the server 2, the microcomputer 311 of the gateway 310 receives data (the compressed difference data, compressed data, or new program) of blocks B(K) (K=1 to N) via the communication unit 316 (step S200). The microcomputer 311 of the gateway 310 stores the data received from the server 2 in the FLASH memory 313 (step S205). Next, the microcomputer 311 of the gateway 310 performs processes from steps S200 to S205 on all blocks B(K) (K=1 to N).

The microcomputer 311 of the gateway 310 determines whether or not a requirement of updating the program stored in the FLASH memory 303 of the ECU 300 is satisfied (step S210). For example, when the user performs a predetermined operation in a predetermined driving condition, it is determined that the requirement to update the program is satisfied.

When the requirement to update the program is satisfied (step S210: YES), the microcomputer 311 of the gateway 310 generates a frame from the data stored in the FLASH memory 313 (step S215).

Figure 17:
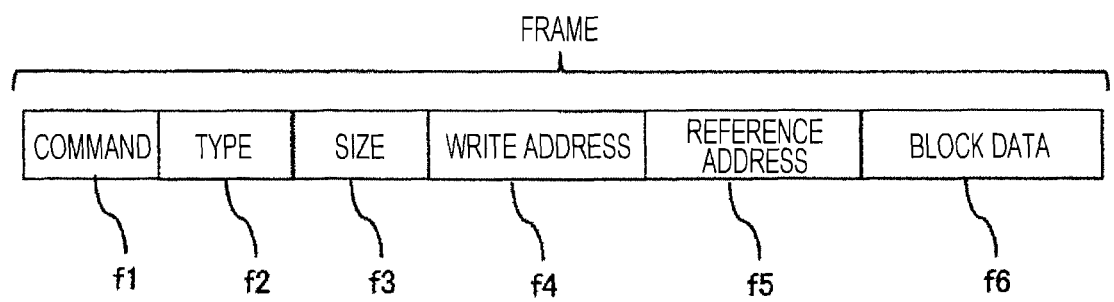
FIG. 17 illustrates an example of a configuration diagram of a frame generated by the gateway.

In detail, as illustrated in FIG. 17, the microcomputer 311 of the gateway 310 generates a frame including a command f1 to the ECU 300, a block data type f2, a block data size f3, a block address f4 where the block data is to be written, a block address f5 of the older version of the program to be referred in a storing process, and block data f6.

Here, to the command f1, a command to instruct for writing is set. The block data is the compressed difference data, compressed data, or new program of block B(K). The block data type f2 indicates whether the block data is the compressed difference data, compressed data, or new program. The block data size f3 indicates the size of the compressed difference data size, compressed data size, or the size of the new program as it is.

In this manner, the microcomputer 311 (computation unit) of the gateway 310 (the program writing device) generates a frame in which the block data type f2 is added to the block data f6.

Here, in FIG. 17, although it is not illustrated, the frame includes a sending node ID and a receiving node ID. Here, the sending node is an ID of the gateway 310 and the receiving node is an ID of the ECU 300.

Referring back to FIG. 16, the microcomputer 311 of the gateway 310 transmits the generated frame to the ECU 300 via the communication unit 316 (step S220).

Figure 18:
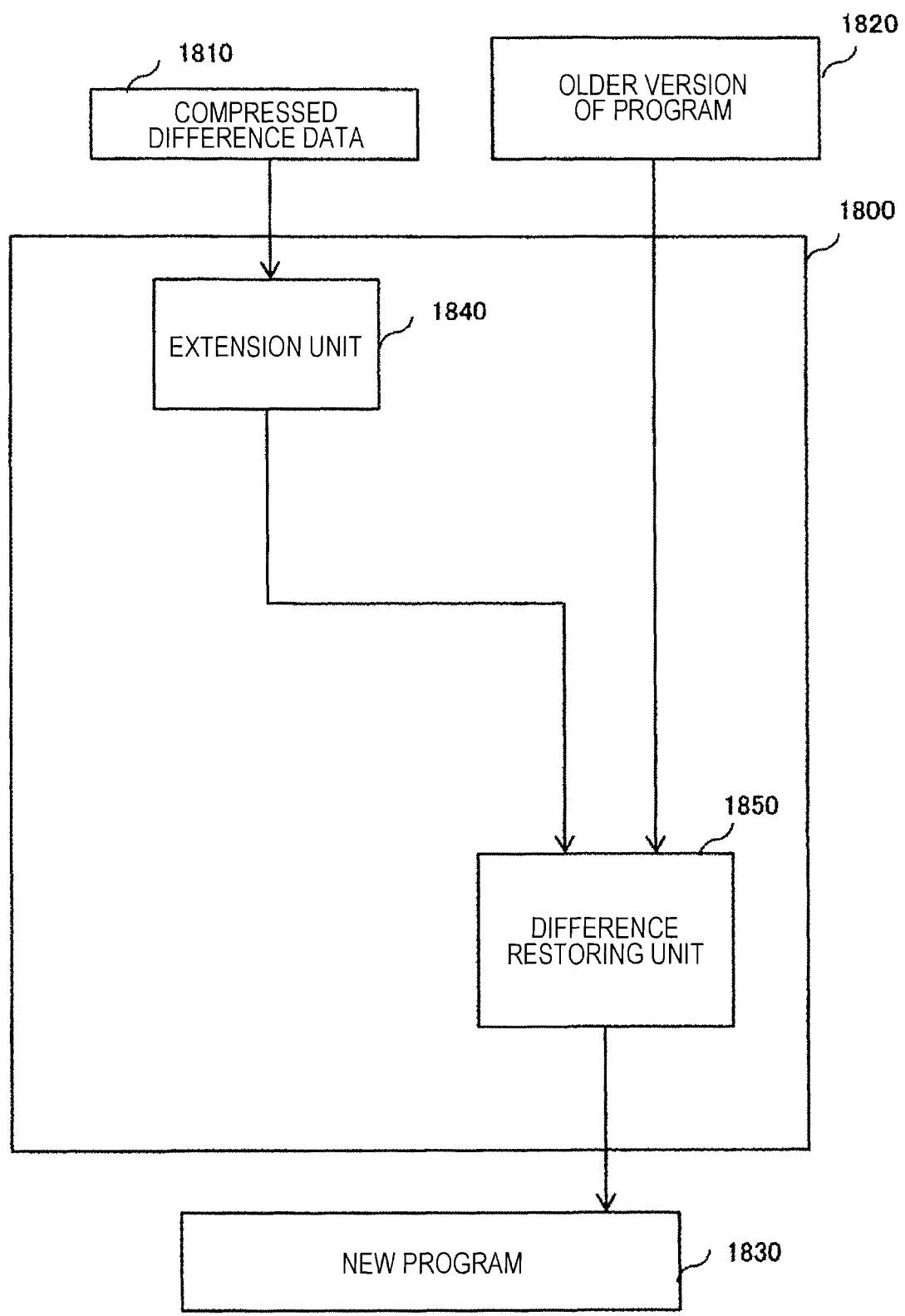
FIG. 18 is a configuration diagram of restoration software.

Next, restoration software provided in the FLASH memory 303 of the ECU 300 will be explained. FIG. 18 illustrates a configuration of the restoration software. Here, the computation unit 301 of the ECU 300 executes a following process by executing the restoration software 1800.

Inputs to the computation unit 301 (restoration software 1800) are compressed difference data 1810 and an older version of the program 1820. The restoration software 1800 includes a decompression unit 1840 for decompress the compressed difference data and a difference restoring unit 1850 for restoring a new program 1830 from a difference as an input from the decompression unit 1840 and the older version of the program 1820. In this manner, the restoration software 1800 is composed of the decompression unit and the difference restoring unit.

Figure 19:
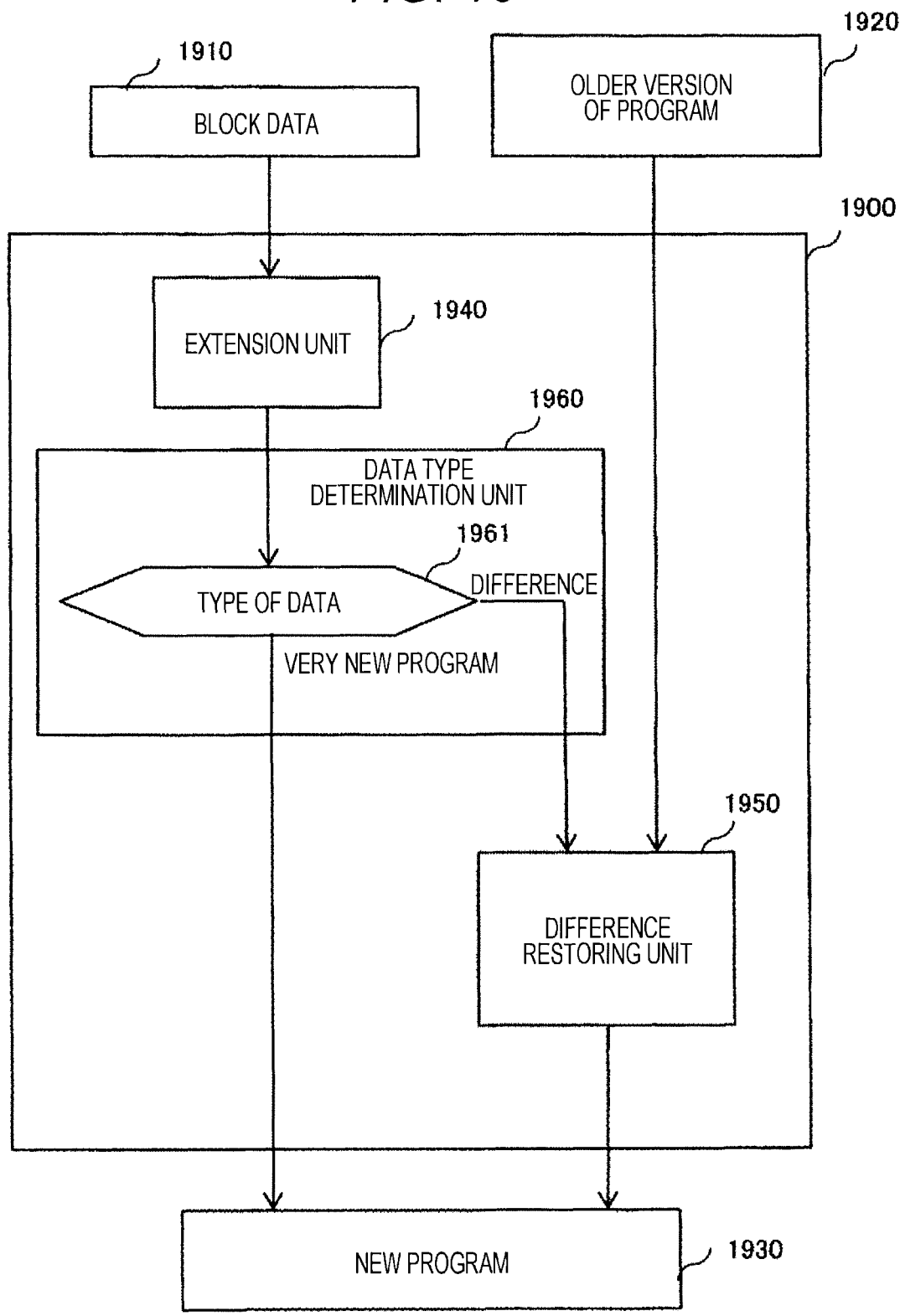
FIG. 19 illustrates a configuration of restoration software in the ECU compatible with the selection-function-included compressed difference data generating software and restriction-function-included compressed difference data generating software.

On the other hand, to handle selection-function-included compressed difference data and restriction-function-included compressed difference data, it is needed to restore the compressed data as well as the compressed difference data. FIG. 19 illustrates a configuration of new restoration software 1900 corresponding to the selection-function-included compressed difference data generating software 800 (FIG. 8) and the restriction-function-included compressed difference data generating software 900 (FIG. 9). Here, the computation unit 301 of the ECU 300 performs the following process by executing the restoration software 1900.

Firstly, inputs to the computation unit 301 (restoration software 1900) are block data 1910 and an older version of the program 1920. The block data 1910 is compressed difference data or compressed data. The new program, as it is, is not handled by the restoration software 1900, which will be described later with reference to FIG. 21. Thus, the block data 1910 as an input to the restoration software 1900 is compressed difference data or compressed data.

The restoration software 1900 has a characteristic that a data type determination unit 1960 is included in addition to a decompression unit 1940 and a difference restoring unit 1950. When the block data 1910 is input, the decompression unit 1940 generates data by decompressing the block data 1910. When it is determined that the type of the decompressed data is a difference in a determination 1961, the data type determination unit 1960 transfers the difference to the difference restoring unit 1950. The difference restoring unit 1950 generates new program 1930 by using the difference and the older version of the program 1920 as inputs. On the other hand, when it is determined the type of the decompressed data is a new program in the determination 1961, the new program is output as the new program 1930.

In this manner, the restoration software 1900 includes a function to determine a difference or new program in the restoration software 1900. The output data 850 of the selection-function-included compressed difference data generating software 800 in FIG. 8 includes information to determine compressed difference data or compressed data, and similarly, the output data 930 of the restriction-function-included compressed difference data generating software 900 in FIG. 9 also includes determination information that indicates any one of compressed difference data, compressed data, or a new program as it is.

Next, a flowchart will be explained with reference to FIG. 20, in which the selection-function-included compressed difference data generating software 800 updates the FLASH memory 303 of the ECU 300 by restoring transmitted block data (FIG. 10).

When a frame is received in step S230, the ECU 300 inputs its block data and an older version of the program in the blocks of the FLASH memory in the ECU 300 to the restoration software 1900 in step S235 and executes the restoration software 1900. As a result, the new program is restored in a second area in the SRAM. Next, in step S240, block in the FLASH having the address f4 in the ECU 300 is deleted and rewritable. At last, in step S245, the new program in the second area of the SRAM is written in the block and the process ends.

With the above configuration, the new program can be updated for each block. All of the programs can be updated by receiving all of the frames (step S230) and writing the new program in each block.

Next, a flowchart will be explained with reference to FIG. 21, in which the restriction-function-included compressed difference data generating software 900 updates the FLASH memory 303 of the ECU 300 by restoring the transmitted block data (FIG. 11).

When a frame is received in step S250, the ECU 300 defines two cases including a case of compressed difference data or compressed data and a case of a new program as it is based on the block data type f2 in step S255. In the case of compressed difference data or compressed data, in step S260, the block data and the older version of the program in the block of the FLASH memory in the ECU 300 are input to the restoration software 1900 and the restoration software 1900 is executed.

As a result, the new program is restored in the second area of the SRAM. Next, in step S265, the block in the FLASH of the address f4 in the ECU 300 is deleted and made rewritable. Next, in step S270, the new program in the second area of the SRAM is written in the block and the process ends. On the other hand, when the case that the block data type f2 is the new program as it is in step S255, the block of the FLASH of the address f4 in the ECU 300 is deleted and made writable in step S265. Next, in step S270, the new program is written in the block and the process ends.

With the above configuration, the new program can be updated for each block. All the programs can be updated by receiving all the frames (step S250) and writing the new program in each block.

As described above, according to the present embodiment, reprogramming can be carried out quickly and easily.

Further, the user can perform reprogramming anywhere without bringing the vehicle to a dealer.

Here, the present invention is not limited to the above described embodiment and various modifications are included. For example, the above embodiment has been described in detail to clearly explain the present invention and the present invention is not limit to the configuration including all the above described configurations. Further, a part of the configuration of one embodiment may be replaced with a configuration of another embodiment, and a configuration of one embodiment may be added to a configuration of another embodiment. Further, a part of a configuration of each embodiment may be added with, deleted, or replaced with another configuration.

In the above embodiment, the program generating device 100 includes two computers (the PC 1 and server 2); however, any number of computers may be used.

According to the above embodiment, the data is transmitted in units of blocks from the PC 1 to the server 2; however, the compressed difference data and compressed data in a plurality of blocks may be transmitted at once when the PC 1 and server 2 have sufficient memory capacities. Further, the transmission from the server 2 to the gateway 310 relies on the capacities of the SRAM 312 and FLASH memory 313 in the gateway 310. When the SRAM 312 and FLASH memory 313 have a sufficient size, some pieces of the data may be transmitted all at once.

On the other hand, in the transmission from the gateway 310 to the ECU 300 via the CAN, since the SRAM capacity 302 in the ECU is small, the data needs to be transmitted in units of one or more blocks. The example describes that the SRAM size required to restore is the size of one block; however, the compressed difference data or compressed data may be generated in units of a plurality of blocks according to the size of the SRAM 302. This selection may be determined according to the size of the SRAM 302.

The above described embodiment describes that the FLASH memory 303 is composed of blocks of two sizes; however, the FLASH memory 303 may include blocks in three different sizes. Further, the FLASH memory 303 may include blocks in one size.

Further, a part of or all of the above described configurations, functions, and the like may be realized by hardware by designing an integrated circuit or the like, for example. Further, the above described configurations, functions, and the like may be realized by software by interpreting and executing a program that causes a processer to realize each function. The program that realizes each function and information such as a tale, a file, or the like may be stored in a memory device such as a memory, a hard disk, a solid state drive (SSD), or the like or in a recording medium such as an IC card, an SD card, a DVD, or the like.

Here, the embodiment of the present invention may be made in the following aspects.

(First Aspect)

A vehicle-mounted control device has a configuration that, when a type of the block data is compressed difference data, the computation unit restores a new program from the block data and the older version of the program stored in a block corresponding to the address, and writes the restored new program in the block of the write address.

(Second Aspect)
A vehicle-mounted control device has a configuration that,
when a type of the block data is compressed data, the computation unit restores a new program from the block data and writes the restored new program in the block of the write address.

(Third Aspect)
A vehicle-mounted control device has a configuration that the non-volatile memory is configured from at least two blocks in different sizes.

(Fourth Aspect)
A vehicle-mounted control device has a configuration that the non-volatile memory is a FLASH memory.

(Fifth Aspect)
A vehicle-mounted control device has a configuration that the volatile memory is an SRAM.

(Sixth Aspect)
A vehicle-mounted control device has a configuration that
the computation unit is a microcomputer and
the volatile memory and non-volatile memory are provided inside the microcomputer.

(Seventh Aspect)
A compressed difference data generating program includes
an input determination step of determining whether or not there is an input of first data, and
in a selecting step,
when it is determined that there is no input of the first data in the input determination step, compressed data in which second data is compressed is output.

(Eighth Aspect)
A compressed difference data generating program includes
an input determination step of determining whether or not there is an input of first data, and
in selecting step,
when it is determined that there is an input of the first data in the input determination step and the size of the compressed difference data is smaller than a reference value, compressed difference data is output.

REFERENCE SIGNS LIST

1 . . . PC
2 . . . server
3 . . . vehicle-mounted system
100 . . . program generating device
101 . . . computation unit
102 . . . input unit
103 . . . display unit
104 . . . communication unit
105 . . . memory unit
201 . . . computation unit
202 . . . input unit
203 . . . display unit
204 . . . communication unit
205 . . . memory unit
300 . . . ECU (vehicle-mounted control device)
301 . . . microcomputer (computation unit)
302 . . . SRAM (volatile memory)
302a . . . first area in SRAM
302b . . . second area in SRAM
303 . . . FLASH memory (non-volatile memory)
304 . . . various ICs
305 . . . communication unit
310 . . . gateway (program writing device)
311 . . . microcomputer
312 . . . SRAM
313 . . . FLASH memory
314 . . . various ICs
315 . . . communication unit (CAN protocol)
316 . . . communication unit (vehicle external network protocol)
600 . . . compressed difference data generating software
700 . . . compressed data generating software
800 . . . selection-function-included compressed difference data generating software
900 . . . restriction-function-included compressed difference data generating software
1800 . . . compressed difference data restoration software
1900 . . . new compressed difference data restoration software

The invention claimed is:

1. A vehicle-mounted control device comprising:
a non-volatile memory configured to include a plurality of blocks and store an older version of a program;
a volatile memory configured to store compressed data;
a communication interface configured to receive, from a remote processor, compressed difference data or block data, a type of the block data, and a frame, the compressed difference data being data for which a difference between first data including at least one piece of data obtained by dividing the older version of the program into a size of the blocks and second data including one piece of data obtained by dividing a newer version of the program into the block size is compressed,
wherein the remote processor is configured to store a remote copy of the older version of the program and the newer version of the program and generate the compressed difference data; and
a microcomputer configured to store the block data and the type of the block data in the volatile memory, restore the second data in the volatile memory according to the type of the block data, and write the restored second data to a write address of the block in non-volatile memory,
wherein the compressed difference data comprises data in which the difference between the first data and the second data of different blocks is compressed.

2. The vehicle-mounted control device according to claim 1, wherein the compressed difference data comprises data in which a difference in a size equal to or smaller than a reference value among the differences between the first data and second data, is compressed.

3. The vehicle-mounted control device according to claim 1, wherein the compressed difference data comprises data in which a difference between the first data corresponding to more than one of the blocks and the second data corresponding to one of the blocks is compressed.

4. The vehicle-mounted control device according to claim 3, wherein the first data includes the older version of the program stored in more than one of the blocks from a first block to the one block.

5. The vehicle-mounted control device according to claim 3, wherein the first data includes the older version of the program stored in more than one of the blocks from the one block to a last block.

6. The vehicle-mounted control device according to claim 3, wherein the compressed difference data comprises data in which a difference between the first data and second data in different blocks is compressed without generating compressed difference data of an entirety of the newer version of the program or an entirety of the older version of the program.

7. The vehicle-mounted control device according to claim 1, wherein the first data includes the older version of the program stored in more than one of the blocks from a first block to one block.

8. The vehicle-mounted control device according to claim 1, wherein the first data includes the older version of the program stored in more than one of the blocks from one block to a last block.

9. The vehicle-mounted control device according to claim 1, wherein the compressed difference data comprises data in which a difference between a predetermined number of pieces of the first data and a predetermined number of pieces of the second data is compressed.

10. A vehicle-mounted control device comprising:
a non-volatile memory configured to include a plurality of blocks and store an older version of a program;
a volatile memory configured to store compressed data;
a communication interface configured to receive, from a remote processor, a frame including a compressed difference data and a write address of the block in non-volatile memory, the compressed difference data being data for which a difference between first data including at least one piece of data obtained by dividing the older version of the program into a size of the blocks and second data including one piece of data obtained by dividing a newer version of the program into the block size is compressed,
wherein the remote processor is configured to store a remote copy of the older version of the program and the newer version of the program and generate the compressed difference data; and
a microcomputer configured to store the compressed difference data in the volatile memory, restore the second data in the volatile memory from the compressed difference data, and write the restored second data to the write address of the block in non-volatile memory,
wherein each number is given to each of the blocks of the older version of the program and the newer version of the program,
wherein the compressed difference data is generated in ascending order of the number assigned to the block when an addition of an amount of data above a first threshold is done to the data of the block of the newer version of the program, and
wherein the compressed difference data is generated in descending order of the number assigned to the block when a deletion of an amount of data above a second threshold is done to the data of the block.

11. The vehicle-mounted control device of claim 10, wherein the remote processor is configured to generate the compressed difference data and establish a connection to the communication interface,
wherein the connection is one of (i) a wireless local area network connection, (ii) a cellular network connection, (iii) an Internet connection, or (iv) a direct crossover connection.

12. The vehicle-mounted control device according to claim 10, wherein the compressed difference data comprises data in which a difference between the first data and second data in different blocks is compressed without generating compressed difference data of an entirety of the newer version of the program or an entirety of the older version of the program.

* * * * *